United States Patent
Green et al.

(10) Patent No.: US 8,514,891 B2
(45) Date of Patent: *Aug. 20, 2013

(54) MEDIA STREAM SPLICER

(75) Inventors: Dustin L. Green, Redwood City, CA (US); John H. Grossman, IV, Fremont, CA (US); James Armand Baldwin, Redwood City, CA (US); Peter T. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 556 days.

This patent is subject to a terminal disclaimer.

(21) Appl. No.: 12/210,590

(22) Filed: Sep. 15, 2008

(65) Prior Publication Data
US 2009/0010273 A1    Jan. 8, 2009

Related U.S. Application Data

(63) Continuation of application No. 10/789,128, filed on Feb. 27, 2004, now Pat. No. 7,430,222.

(51) Int. Cl.
*H04H 20/28*    (2008.01)
*H04N 7/173*    (2011.01)

(52) U.S. Cl.
USPC ............................................ 370/486; 725/86

(58) Field of Classification Search
USPC ......................................................... 370/432
See application file for complete search history.

(56) References Cited

U.S. PATENT DOCUMENTS

| | | |
|---|---|---|
| 5,461,415 A | 10/1995 | Wolf et al. |
| 5,473,362 A | 12/1995 | Fitzgerald et al. |
| 5,583,868 A | 12/1996 | Rashid et al. |
| 5,631,694 A | 5/1997 | Aggarwal et al. |
| 5,699,362 A | 12/1997 | Makam |
| 5,724,646 A | 3/1998 | Ganek et al. |
| 5,732,217 A | 3/1998 | Emura |
| 5,822,537 A | 10/1998 | Katseff et al. |
| 5,884,141 A | 3/1999 | Inoue et al. |
| 5,892,915 A | 4/1999 | Duso et al. |
| 5,926,230 A | 7/1999 | Niijima et al. |
| 5,936,659 A | 8/1999 | Viswanathan et al. |
| 5,963,202 A | 10/1999 | Polish |
| 6,047,317 A | 4/2000 | Bisdikian et al. |

(Continued)

FOREIGN PATENT DOCUMENTS

| | | |
|---|---|---|
| CA | 2480461 | 10/2003 |
| EP | 0633694 | 1/1995 |

(Continued)

OTHER PUBLICATIONS

U.S. Appl. No. 11/010,200; Smith, et al.; Filed Dec. 10, 2004.

(Continued)

*Primary Examiner* — Timothy J Weidner
(74) *Attorney, Agent, or Firm* — Alleman Hall McCoy Russell & Tuttle LLP

(57) ABSTRACT

An implementation is described herein, which facilitates a fast channel change by receiving and decoding a unicast acquisition media stream that corresponds to a soon-to-be-requested target multicast media stream. It does this before requesting the target multicast media stream of the new channel. Once the transmission of the unicast stream is caught up with the multicast stream, this implementation splices from the unicast acquisition stream to the target multicast media stream.

42 Claims, 11 Drawing Sheets

(56) References Cited

U.S. PATENT DOCUMENTS

| | | | |
|---|---|---|---|
| 6,078,594 A | 6/2000 | Anderson et al. | |
| 6,118,498 A | 9/2000 | Reitmeier | |
| 6,138,147 A | 10/2000 | Weaver et al. | |
| 6,222,482 B1 | 4/2001 | Gueziec | |
| 6,222,886 B1 | 4/2001 | Yogeshwar | |
| 6,266,817 B1 | 7/2001 | Chaddha | |
| 6,330,286 B1 | 12/2001 | Lyons et al. | |
| 6,418,473 B1 | 7/2002 | St. Maurice et al. | |
| 6,430,547 B1 | 8/2002 | Busche et al. | |
| 6,496,814 B1 | 12/2002 | Busche | |
| 6,505,106 B1 | 1/2003 | Lawrence et al. | |
| 6,512,776 B1* | 1/2003 | Jones et al. | 370/432 |
| 6,564,262 B1 | 5/2003 | Chaddha | |
| 6,580,754 B1 | 6/2003 | Wan et al. | |
| 6,609,149 B1 | 8/2003 | Bandera et al. | |
| 6,615,133 B2 | 9/2003 | Boies et al. | |
| 6,637,031 B1* | 10/2003 | Chou | 725/87 |
| 6,721,952 B1 | 4/2004 | Guedalia et al. | |
| 6,728,965 B1 | 4/2004 | Mao | |
| 6,738,980 B2 | 5/2004 | Lin et al. | |
| 6,751,129 B1 | 6/2004 | Gongwer | |
| 6,751,626 B2 | 6/2004 | Brown et al. | |
| 6,766,245 B2 | 7/2004 | Padmanabhan | |
| 6,842,724 B1 | 1/2005 | Lou et al. | |
| 6,856,759 B1 | 2/2005 | Fukuda et al. | |
| 6,898,246 B2 | 5/2005 | Katayama | |
| 7,051,170 B2 | 5/2006 | Guo | |
| 7,106,749 B1 | 9/2006 | Darshan et al. | |
| 7,158,531 B2 | 1/2007 | Barton | |
| 7,167,488 B2 | 1/2007 | Taylor et al. | |
| 7,334,044 B1 | 2/2008 | Allen | |
| 7,382,796 B2 | 6/2008 | Haberman et al. | |
| 7,443,791 B2 | 10/2008 | Barrett et al. | |
| 7,516,232 B2 | 4/2009 | Barrett et al. | |
| 7,523,482 B2 | 4/2009 | Barrett et al. | |
| 7,545,812 B2 | 6/2009 | Barrett et al. | |
| 7,565,681 B2* | 7/2009 | Ngo et al. | 725/135 |
| 7,574,728 B2* | 8/2009 | Cheung et al. | 725/101 |
| 7,587,737 B2* | 9/2009 | Baldwin et al. | 725/101 |
| 7,603,689 B2* | 10/2009 | Baldwin et al. | 725/101 |
| 7,614,072 B2* | 11/2009 | Park et al. | 725/101 |
| 7,636,934 B2* | 12/2009 | Baldwin et al. | 725/101 |
| 7,698,724 B1* | 4/2010 | Day | 725/97 |
| 7,926,078 B2* | 4/2011 | Arsenault et al. | 725/89 |
| 2002/0002708 A1 | 1/2002 | Arye | |
| 2002/0024956 A1 | 2/2002 | Keller-Tuberg | |
| 2002/0031144 A1 | 3/2002 | Barton | |
| 2002/0040481 A1 | 4/2002 | Okada et al. | |
| 2002/0107968 A1 | 8/2002 | Horn et al. | |
| 2002/0108119 A1 | 8/2002 | Mao et al. | |
| 2002/0114331 A1 | 8/2002 | Cheung et al. | |
| 2002/0124258 A1 | 9/2002 | Fritsch | |
| 2002/0144276 A1 | 10/2002 | Radford et al. | |
| 2002/0147979 A1 | 10/2002 | Corson | |
| 2002/0147991 A1 | 10/2002 | Furlan et al. | |
| 2002/0170067 A1 | 11/2002 | Norstrom et al. | |
| 2003/0037331 A1* | 2/2003 | Lee | 725/32 |
| 2003/0060196 A1 | 3/2003 | Levinber | |
| 2003/0088646 A1* | 5/2003 | Yeo | 709/219 |
| 2003/0093801 A1 | 5/2003 | Lin et al. | |
| 2003/0106053 A1 | 6/2003 | Sih et al. | |
| 2003/0158899 A1 | 8/2003 | Hughes | |
| 2003/0159143 A1 | 8/2003 | Chan | |
| 2003/0202594 A1 | 10/2003 | Lainema | |
| 2003/0202775 A1 | 10/2003 | Junkersfeld et al. | |
| 2004/0003399 A1 | 1/2004 | Cooper | |
| 2004/0031056 A1* | 2/2004 | Wolff | 725/110 |
| 2004/0031058 A1* | 2/2004 | Reisman | 725/112 |
| 2004/0034863 A1 | 2/2004 | Barrett et al. | |
| 2004/0034864 A1 | 2/2004 | Barrett et al. | |
| 2004/0049793 A1 | 3/2004 | Chou | |
| 2004/0128694 A1 | 7/2004 | Bantz et al. | |
| 2004/0160971 A1 | 8/2004 | Krause et al. | |
| 2004/0160974 A1 | 8/2004 | Read et al. | |
| 2004/0255328 A1 | 12/2004 | Baldwin et al. | |
| 2005/0039214 A1 | 2/2005 | Lorenz et al. | |
| 2005/0071496 A1 | 3/2005 | Singal et al. | |
| 2005/0078680 A1 | 4/2005 | Barrett et al. | |
| 2005/0078757 A1 | 4/2005 | Nohrden | |
| 2005/0080904 A1 | 4/2005 | Green | |
| 2005/0081243 A1 | 4/2005 | Barrett et al. | |
| 2005/0081244 A1 | 4/2005 | Barrett et al. | |
| 2005/0081246 A1 | 4/2005 | Barrett et al. | |
| 2005/0128951 A1 | 6/2005 | Chawla et al. | |
| 2005/0154917 A1 | 7/2005 | DeCarrmo | |
| 2005/0172314 A1 | 8/2005 | Krakora et al. | |
| 2005/0190781 A1 | 9/2005 | Green et al. | |
| 2005/0240961 A1 | 10/2005 | Jerding et al. | |
| 2006/0117343 A1 | 6/2006 | Novak et al. | |
| 2006/0117358 A1 | 6/2006 | Baldwin et al. | |
| 2006/0117359 A1 | 6/2006 | Baldwin et al. | |
| 2006/0251082 A1 | 11/2006 | Grossman et al. | |
| 2007/0005795 A1* | 1/2007 | Gonzalez | 709/232 |
| 2007/0034863 A1 | 2/2007 | Fortte et al. | |
| 2007/0107026 A1* | 5/2007 | Sherer et al. | 725/97 |
| 2007/0113261 A1 | 5/2007 | Roman et al. | |
| 2007/0113291 A1 | 5/2007 | Dai et al. | |
| 2007/0280298 A1* | 12/2007 | Hearn et al. | 370/498 |
| 2007/0298789 A1* | 12/2007 | Murali et al. | 455/434 |
| 2008/0059997 A1* | 3/2008 | Plotnick et al. | 725/32 |
| 2008/0117343 A1 | 5/2008 | Huang | |
| 2008/0137685 A1* | 6/2008 | Gunaseelan et al. | 370/468 |
| 2009/0094639 A1* | 4/2009 | Haberman et al. | 725/34 |
| 2009/0106792 A1* | 4/2009 | Kan et al. | 725/34 |
| 2009/0199248 A1* | 8/2009 | Ngo et al. | 725/90 |
| 2011/0093879 A1* | 4/2011 | Salkind et al. | 725/23 |

FOREIGN PATENT DOCUMENTS

| | | |
|---|---|---|
| EP | 1294193 | 3/2003 |
| WO | WO9806045 | 2/1998 |
| WO | WO9909741 | 2/1999 |
| WO | WO0009741 A1 | 2/2000 |
| WO | WO0103373 | 1/2001 |
| WO | WO0126271 | 4/2001 |
| WO | WO0156285 | 8/2001 |
| WO | WO02087235 | 10/2002 |
| WO | WO03088646 A2 | 10/2003 |
| WO | WO03088648 | 10/2003 |
| WO | WO2004062291 | 7/2004 |

OTHER PUBLICATIONS

Armitage, "Support for Multicast over UNI 3.0/3.1 based ATM Networks", RFC 2022, Standards Track, Nov. 1996, pp. 1-82.
BenAbdelkader, et al., "Combining Holistic and Parametric Approaches for Gait Recognition," Submitted to IEEE Transactions on Pattern Analysis and Machine Intelligence, Dec. 2002, 37 pages.
BenAbdelkader, et al., "EigenGait: Motion-based Recognition of People Using Image Self-similarity," Proc Intl. on Audio and Video-based Person Authentication (AVBPA), 2001, 11 pages.
BenAbdelkader, et al., "Motion-based Recognition of People in Eigengait Space", 5th International Conference on Automatic Face and Gesture Recognition, May 20, 2002, pp. 1-6.
BenAbdelkader, et al., "Person Identification Using Automatic Height and Stride Estimation," IEEE International Conference on Pattern Recognition, Aug. 11, 2002-Aug. 15, 2002, pp. 1-4.
BenAbdelkader, et al., "Stride and Cadence as a Biometric in Automatic Person Identification and Verification", 5th International Conference on Automatic Face and Gesture Recognition, May 20, 2002, pp. 1-6.
BenAbdelkader, et al., "View-Invariant Estimation of Height and Stride for Gait Recognition", Workshop on Biometric Authentication (BIOMET), in association with ECCV 2002, Jun. 1, 2002, 12 pages.
Cutler, et al., "Robust Real-Time Periodic Motion Detection, Analysis, and Applications," IEEE Transactions on Pattern Analysis and Machine Intelligence (PAMI), vol. 22, No. 8, Aug. 2000, pp. 781-796.
"Digital Headend Solutions; Tune in to Digital TV", retrieved from the Internet on Nov. 3, 2005, Available at [[http://www.tutsystems.com/digitalheadend/solutions/index.cfm]], 1 page.
Ding, et al., "Resource-Based Striping: An Efficient Striping Strategy for Video Servers Using Heterogeneous Disk-Subsystems", Multimedia Tools and Applications, vol. 19, No. 1, Jan. 2003, pp. 29-51.

Elgammal, et al., "Non-parametric Model for Background Substraction," IEEE ICCV99 Frame Rate Workshop, IEEE 7th International Conference on Computer Vision, Kerkyra, Greece, Sep. 1999, pp. 1-17.

Gil, et al., "Simulation of a Mobility Prediction Scheme Based on Neuro-Fuzzy Theory in Mobile Computing", Simulation, Jul. 2000, vol. 75, No. 1, pp. 6-17.

Gonzalez, et al., "Load Sharing Based on Popularity in Distributed Video on Demand Systmes", Proceedings 2002 IEEE Int'l. Conf. on Multimedia and Expo, vol. 1, Aug. 2002, pp. 5-8.

Halvorsen et al., "Q-L/MRP: A Buffer Muffer Management Mechanism for QoS Support in a Multimedia DBMS", IEEE 1998, pp. 162-171.

Haritaoglu, et al., "W4S: A Real-Time System for Detecting and Tracking People in 2 1/2 D," in European Conference on Computer Vision, 1998, 16 pages.

Hurst, et al., "MPEG Splicing: A New Standard for Television-SMPTE 312M", SMPTE Journal, Nov. 1998, pp. 978-988.

"Infovalue Experts; Info Value Unveils Industry's First Video Multicasting Solution with Instant Replay", retrieved from the Internet on Nov. 3, 2005, Available at [[http;//www.infovalue.com/links/news%20room/press%20releases/1999/Press_%20First_Multicasting_with_Instant_Replay.pdf]], 3 pages.

Kamiyama et al., "Renegotiated CBR Transmission in Interactive Video-on-Demand System", IEEE 1997, pp. 12-19.

Lee, "Staggered Push—A Linearly Scalable Architecture for Push-Based Parallel Video Servers", IEEE Transactions on Multimedia, vol. 4, No. 4, Dec. 2002, pp. 423-434.

Lo, et al., "Deploy Multimedia-on-Demand Services over ADSL Networks", PCM 2002; Lecture Notes in Computer Science, vol. 2532, Dec. 2002, pp. 295-302.

Lu et al., "Experience in designing a TCP/IP based VOD system over a dedicated network", IEEE 1997, pp. 262-266.

McKinley, et al., "Group Communication in Multichanel Networks with Staircase Interconnection Topologies", Computer Communication Review, ACM, Sep. 1989, vol. 19, No. 4, pp. 170-181.

MediaFLO; Introducing FLO Technology:, retrieved from the Internet on Nov. 3, 2005, available at [[http://www.qualcomm.com/mediaflo/news/pdf/flo_whitepaper.pdf]], pp. 1-8.

"Multidimensional Database Technology", Computer, Dec. 2001, vol. 34, No. 12, pp. 40-46.

"Optibase MGW 2400", retrieved from the Internet Nov. 3, 2005, Available at [[http://www.epecomgraphics.com/optibase_mgw2400_features.htm]], 2 pages.

Petit et al., "Bandwidth Resource Optimization in Video-On-Demand Network Architectures", IEEE 1994, pp. 91-97.

"QuickTime Streaming your Media in Real Time", retrieved from the Internet on Nov. 3, 2005, Accessible at [[http://www.apple.com.tw/quicktime/technologies/streaming/]], 3 pages.

Song, et al., "Replica Striping for Multi-Resolution Video Servers", IDMS/PROMS 2002; Lecture Notes in Computer Science, vol. 2515, No. 2002, pp. 300-312.

State, et al., "Active Network Based Management for QoS Assured Multicast Delivered Media", Joint 4th IEEE Int'l Conf. on ATM and High Speed Intelligent Internet Symposium, Apr. 2001, pp. 123-127.

Tsai, R., "An Efficient and Accurate Camera Calibration Technique for 3d Machine Vision", Proceedings of the Computer Vision and Pattern Recognition, 1986, pp. 364-374.

Turk, et al., "Face Recognition Using Eigenfaces," CVPR, 1991, pp. 586-591.

Wee, et al., "Splicing MPEG Video Streams in the Compressed Domain", IEEE 1997, pp. 224-230.

Wolfson, et al., "Modeling Moving Objects for Location Based Services", Lectures Notes in Computer Science, 2002, vol. 2538, pp. 46-58.

Wu, et al., "Scalable Video Coding and Transport over Broad-Band Wireless Networks", Proceedings of the IEEE, Jan. 2001, vol. 89, No. 1, pp. 6-20.

Zhang, et al., "Data Modeling of Moving Objects with GPS/GIS in Web Environment", International Conference on Communications, Circuits and Systems and West Sino Exposition Proceedings, 2002, vol. 2 pp. 1581-1585.

Zhang, et al., "The Coat Model of Moving Objects Communication with GPS", International Conference on Communications, Circuits and Systems and West Sino Exposition Proceedings, 2002, vol. 2, pp. 1576-1580.

Zhou, et al., "On-line Scene Change Detection of Multicast (MBone) Video", Proceedings of the SPIE—The International Society for Optical Engineering, Nov. 1998, vol. 3527, pp. 271-282.

Murphy, "Overview of MPEG", retrieved on Mar. 29, 2007, at <<http://web.archive.org/web/20001203031200/http://www.eeng.dcu.ie/~murphyj/the/the/no..>>, pp. 1-3.

Murphy, John, "Overview of MPEG," web.archive.org, <http://web.archive.org/web/20000101000000-20050408235959/http://www.eeng.dcu.ie/~murphyj/the/the/node39.html>, Sep. 28, 1996, Access date Apr. 8, 2010, 3 pages.

* cited by examiner

Fig. 1 (background)

Fig. 2 (background)

MEDIA STREAM SPLICER

CROSS-REFERENCE TO RELATED APPLICATION

This is a continuation of U.S. patent application Ser. No. 10/789,128, filed on Feb. 27, 2004 and entitled, "Media Stream Splicer", the entire contents of which are hereby incorporated by reference.

TECHNICAL FIELD

This invention generally relates to network communications technology.

BACKGROUND

Traditionally, typical network computing environments include point-to-point communication between two computing devices. However, some communications technologies employ multi-point communications, where groups of computing devices simultaneously receive a common transmission.

Unicast and Multicast

There are at least two common approaches to simultaneously transmitting the same content to multiple computing devices over a network computing environment: unicast or multicast.

Unicast may be understood to be a communication that takes place over a network between a single sender and a single receiver. With unicast, a computing device generates and sends one set of data packets (each has common content) to each receiving computer. As the receiving group increases in size, unicast becomes increasingly less efficient because it is simultaneously transmitting copies of the same data packets to an increasing number of computing devices. In direct and geometric proportions, unicast requires increasingly more bandwidth as the receiving group increases. That is because the same information is carried multiple times-even on shared links.

Multicast may be understood to be a communication that transmits a single message to a select group of multiple recipients. In contrast to broadcasting, multicasting typically refers to sending a single message to a select group on a network rather than to everyone connected to the network.

With multicast, a computing device generates only one copy and sends it to the select group that chooses to receive it. This technique addresses packets to a group of receivers rather than to a single receiver. It typically depends on the network infrastructure to forward the packets to only the sub-networks and the receivers that need to receive them.

A common implementation of multicasting is Internet Protocol (IP) Multicast. It is a bandwidth-conserving technology that reduces traffic by simultaneously delivering a single stream (e.g., a media stream) of information to thousands of recipients. Typical applications that take advantage of multicast include videoconferencing, corporate communications, distance learning, and distribution of software, stock quotes, and news.

Media Streams

With the advent of digital media streaming technology (such as those using IP multicast), users are able to see and hear digital media, more or less, as the data is being received from a media server.

Herein, a "media stream" is a multimedia object (containing audio and/or visual content, such as a video) that is compressed and encoded in accordance with mechanisms generally available now or in the future for doing so. Furthermore, such a media stream is intended to be decoded and rendered in accordance with generally available mechanisms for doing so.

Without a loss of generality, the same techniques can be applied to any media stream that has a similar structure which reduces temporal, spatial, or perceptual redundancies. For example, many audio compression formats such as AC3 have keyframes followed by modification data to regenerate an approximation of the original uncompressed stream.

Multimedia Distribution Format Standards

Due to the amount of data required to accurately represent such multimedia content, it is typically delivered to the computing device in an encoded, compressed form. To reproduce the original content for presentation, the multimedia content is typically decompressed and decoded before it is presented.

A number of multimedia standards have been developed that define the format and meaning of encoded multimedia content for purposes of distribution. Organizations such as the Moving Picture Experts Group (MPEG) under the auspices of the International Standards Organization (ISO) and International Electrotechnical Commission (IEC), and the Video Coding Experts Group (VCEG) under the auspices of the International Telecommunications Union (ITU) have developed a number of multimedia coding standards (e.g., MPEG-1, MPEG-2, MPEG-4, H.261, H.263, and the like).

There are many different standardized video-stream data formats. For example: MPEG, H.263, MPEG-1, MPEG-2, MPEG-4 Visual, H.264/AVC, and DV formats. Likewise, there are many different standardized audio-stream data formats. For example: MPEG audio, AC3 audio, DTS audio, or MLP audio.

MPEG-2/H.262

The predominant digital video compression and transmission formats are from a family called block-based motion-compensated hybrid video coders, as typified by the ISO/IEC MPEG-x (Moving Picture Experts Group) and ITU-T VCEG H.26x (Video Coding Experts Group) standards. This family of standards is used for coding audio-visual information (e.g., movies, video, music, and such) in a digital compressed format.

For the convenience of explanation, the MPEG-2 video stream (also known as an H.262 video stream) is generally discussed and described herein, as it has a structure that is typical of conventional video coding approaches. However, those who are skilled in the art understand and appreciate that other such digital media compression and transmission formats exist and may be used.

An example representation of a MPEG-2 format is shown in FIG. 1. Each video sequence is composed of a sequence of frames that is typically called Groups of Pictures (or "GOP"), such as GOP 105. A GOP is composed of a sequence of pictures or frames. The GOP data is compressed as a sequence of I-, P- and B-frames where:

An I-frame (i.e., intra-frame) is an independent starting image—(compressed in a similar format to a JPEG image). An I-frame or "key frame" (such as I-frame 100*t*) is encoded as a single image, with no reference to any past or future frames. It is sometimes called a random access point (RAP).

A P-frame (i.e., forward predicted frame) is computed by moving around rectangles (called macroblocks) from the previous I- or P-frame then (if so indicated by the encoder) applying a 'correction' called a residual. Subsequent P-frames (such as P-frame 120*t*) are encoded relative to the past reference frame (such as a previous I- or P-frame).

Zero or more B-frames (i.e., bi-directional predicted frames, such as frames 130 and 132) are formed by a combination of rectangles from the adjacent I- or P-frames, followed (if so indicated by the encoder) by a correction residual.

The GOP structure is intended to assist random access into the stream. A GOP is typically an independently decodable unit that may be of any size as long as it begins with an I-frame.

Transmission and Presentation Timelines

FIG. 1 illustrates two manifestations of the same MPEG-2 video stream. The first is the transmission timeline 100*t* and the other is the presentation timeline 100*p*. This is an example of transmission and presentation timelines of a typical media stream and their relationship to each other.

The transmission timeline 100*t* illustrates a media stream from the perspective of its transmission by a media-stream encoder and transmitter. Alternatively, it may be viewed from the perspective of the receiver of the transmission of the media stream.

As shown in FIG. 1, the I-frame (e.g., 110*t*) is typically temporally longer than the other frames in the transmission timeline. Since it doesn't utilize data from any other frame, it contains all of the data necessary to produce one complete image for presentation. Consequently, an I-frame includes more data than any of the other frames. Since the I-frame has more data than others, it follows that it typically requires greater time for transmission (and, of course, reception) than the other frame types.

FIG. 1 also shows P-frames (such as 120*t*) and B-frames (such as 130*t* and 132*t*) of the transmission timeline 100*t*. Relative to the B-frames, the P-frames are temporally longer in the transmission timeline because they typically include more data than the B-frames. However, P-frames are temporally shorter than I-frames because they include less data than I-frames. Since the B-frames rely on data from at least two other frames, they typically do not need as much data of their own to decode their image as do P-frames (which rely on one other frame).

FIG. 1 also illustrates the presentation timeline 100*p* of the media stream from the perspective of its presentation by the media decoder and presenter. In contrast to their transmission duration, the presentation duration of each frame—regardless of type—is exactly the same. In other words, it displays at a fixed frequency.

The incoming frames of the media stream are decoded, buffered, and then presented at a fixed frequency (e.g., 24 frames per second (fps)) to produce a relatively smooth motion picture presentation to the user. In MPEG 2 used to convey NTSC video, the field rate is fixed, and each MPEG 2 picture may produce 1, 2, or 3 fields. Field pictures are required to produce 1 field, and frame pictures may produce 2 or 3 fields. Thus, the frame picture presentation rate may not be fixed, but it is not dictated by the transmission rate of the frame pictures.

FIG. 1 also illustrates a typical decoded GOP 105 of MPEG in its presentation timeline. This GOP example includes an I-frame 110*p*; six P-frames (e.g., 120*p*); and 14 B-frames (e.g., 130*p* and 132*p*). Typically, each GOP includes a series of consecutively presented decoded frames that begin with an I-frame (such as frame 110*p*).

GOP Presentation Delay

FIG. 1 shows that the I-frame 110*t* of an example GOP is first received beginning at point $T_1$ in time; however, it is not first presented until point $T_2$. The time gap between the two points is called herein the "GOP presentation delay" and is labeled 170 in FIG. 1. It represents the delay from when the receiver first begins receiving the first frame of a GOP (which is typically the I-frame) until the device first presents the first frame of the GOP.

Media-Stream Presentation Start-up Delay

To tune channels in a media-streaming environment (such as in a multicast environment), a receiver requests a target channel. It receives the target media stream and then waits for an access point into the stream. A channel change cannot occur until an access point is received. From the perspective of the user, this can lead to lengthy channel change times.

FIG. 2 illustrates an example of a media-stream presentation start-up delay at 280. The start-up delay is the effective delay experienced by a user. It includes a delay between when a particular media stream is requested and when the first frame of a GOP from the particular media stream is actually presented. As shown in FIG. 2, the start-up delay 280 includes the GOP presentation delay 270 (discussed above).

Referring to FIG. 2, this example is explained. A GOP, starting with I-frame 210*t*, is being transmitted. This is shown in the transmission timeline 200*t*. The receiver seeks to tune into this media stream at request point R. This selection is illustrated as a user selecting a media-stream channel using a remote control 260.

Again, this is an example illustration for explanatory purpose. This point R could be at any moment in time after the beginning (i.e., after the beginning of its I-frame 210*t*) of a GOP.

The receiver must wait for a random access point (or RAP) in order to access the media stream. In this example, each GOP has one RAP. An I-frame is an example of a typical RAP. Therefore, each GOP has one I-frame. So, the receiver must wait for the next I-frame (at the beginning of the next GOP) before it can access the media-stream transmission as shown by transmission timeline 200*t*.

Once the receiver has an I-frame in its buffer, it may refer back to it for dependency decoding of P- and B-frames. Consequently, a conventional system must wait for a RAP before it can start buffering frames (that are useful).

In FIG. 2, the receiver starts buffering the next GOP at point $M_1$ with I-frame 250*t*. Thus, the first frame that may be eventually presented to the user is I-frame 250*t*, because it is the first RAP in the stream after the point at which the receiver joined the stream. Because of the GOP presentation delay (discussed above), it actually starts presenting the GOP (with I-frame 250*p* of presentation timeline 200*p*) at point $M_2$—which is also the presentation start-up point S of the start-up delay 280.

As demonstrated by the screens 262-266, the start-up delay is the effective delay experienced by a user. The user selects a media-stream channel at request point R (using, for example, a remote 260) and sees a blank screen, as shown by screen 262. Of course, there may be information presented here (such as electronic programming information), but, since it is not yet the desired media-stream content, it is effectively blank.

Screen 264 shows that screen remains blank even after the next GOP is currently being received. Screen 266 shows that the first image of frame 250*p* is finally presented to the user.

The average length of this start-up delay is directly affected by the average GOP length. Some media-stream providers employ relatively long average GOP lengths. In those instances, this delay is even more acute because, when changing channels, the user is waiting longer for the next GOP to come around.

It short, this start-up delay is very annoying to, and provokes impatience in, the typical users.

SUMMARY

An implementation is described herein, which facilitates a fast channel change by receiving and decoding a unicast acquisition media stream that corresponds to a soon-to-be-requested target multicast media stream. It does this before requesting the target multicast media stream of the new channel. Once the transmission of the unicast stream is caught up with the multicast stream, this implementation splices from the unicast acquisition stream to the target multicast media stream.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

Figure 1:
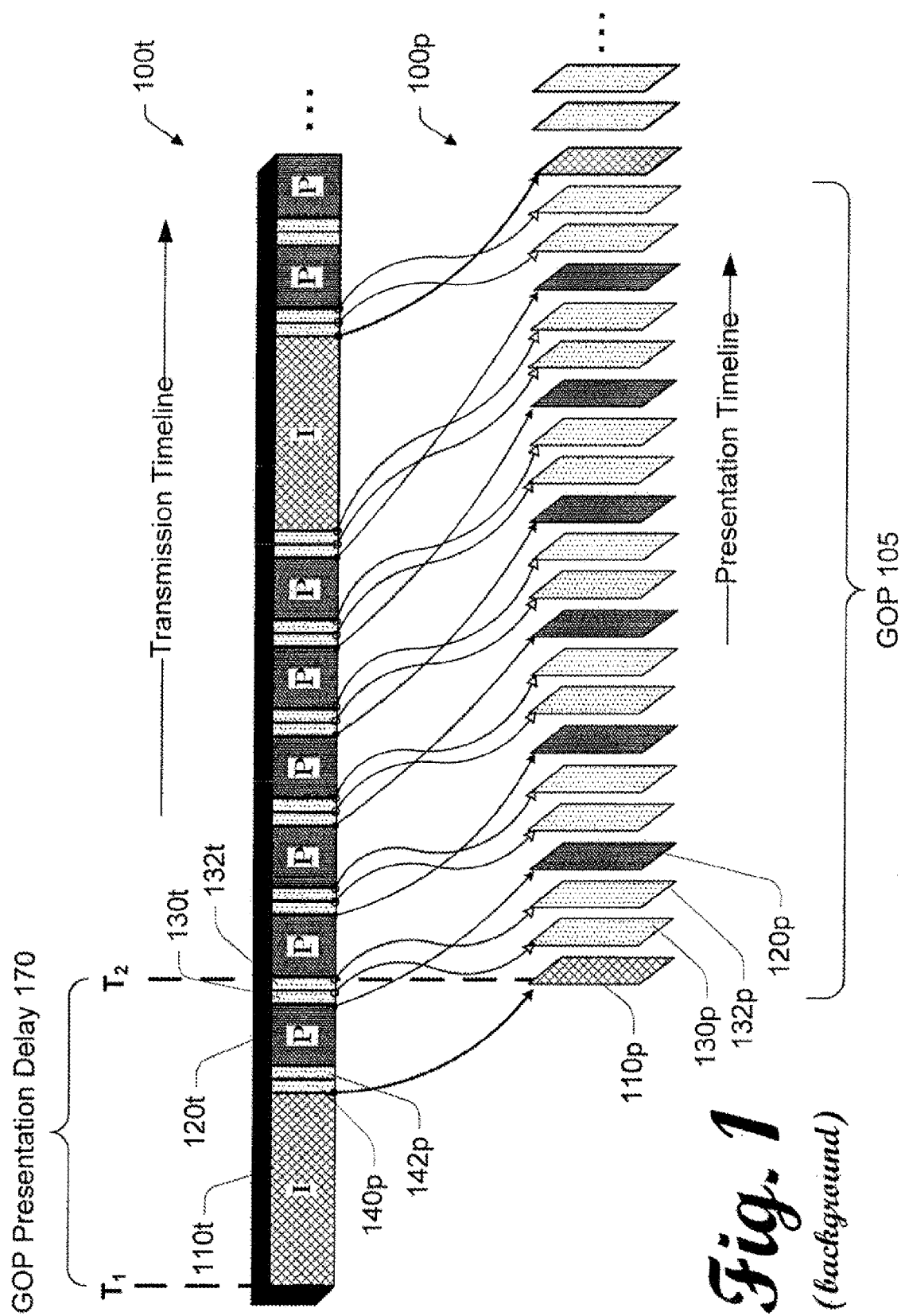
FIG. 1 is a diagram illustrating a typical media stream transmission timeline and its corresponding presentation timeline.

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of the present invention and, thereby, to better explain the present invention. Furthermore, for ease of understanding, certain method steps are delineated as separate steps; however, these separately delineated steps should not be construed as necessarily order dependent in their performance.

The following description sets forth one or more exemplary implementations of a Media Stream Splicer that incorporate elements recited in the appended claims. These implementations are described with specificity in order to meet statutory written description, enabling, and best-mode requirements. However, the description itself is not intended to limit the scope of this patent.

These exemplary implementations, described herein, are examples. These exemplary implementations do not limit the scope of the claimed present invention; rather, the present invention might also be embodied and implemented in other ways, in conjunction with other present or future technologies.

An example of an embodiment of a Media Stream Splicer may be referred to as an "exemplary stream splicer."

While much of the discussion of the exemplary stream splicer is framed within terms of the MPEG family of digital media compression and transmission formats, those of ordinary skill in the art will understand how the concepts discussed herein with relationship to MPEG apply to other formats, such as H.264.

Herein, presenting includes communicating the media content to a display and/or audio device. It may also include storing media content into a memory, transferring such content to another device or component, and/or transmitting the content of signal transmission media.

Introduction

The one or more exemplary implementations of the invention, described herein, may be implemented (in whole or in part) by components like those shown in FIGS. 8-11.

Typical Multicast Network Communication Architecture

Using multicast network communication, a computing device (e.g., a video data server) may send one copy of a set of data packets (e.g., a multimedia stream) to multiple receivers.

A multicast environment is an example of one type of environment that includes the transmission of media streams. Such an environment may utilize Internet Protocol multicasting (i.e., IP multicasting). Those of ordinary skill in the art are familiar with multicast and its use in a multicast environment.

In many IP multicast scenarios, there is a limited bit-rate available to the client device (i.e., a receiver). The bit-rate used by the client device typically depends on which IP multicasts the client is currently listening to among all available IP multicasts.

Because the total number of ongoing IP multicasts is not limited by the available bit-rate to any particular client, the exemplary stream splicer is particularly applicable to such a scenario.

Figure 2:
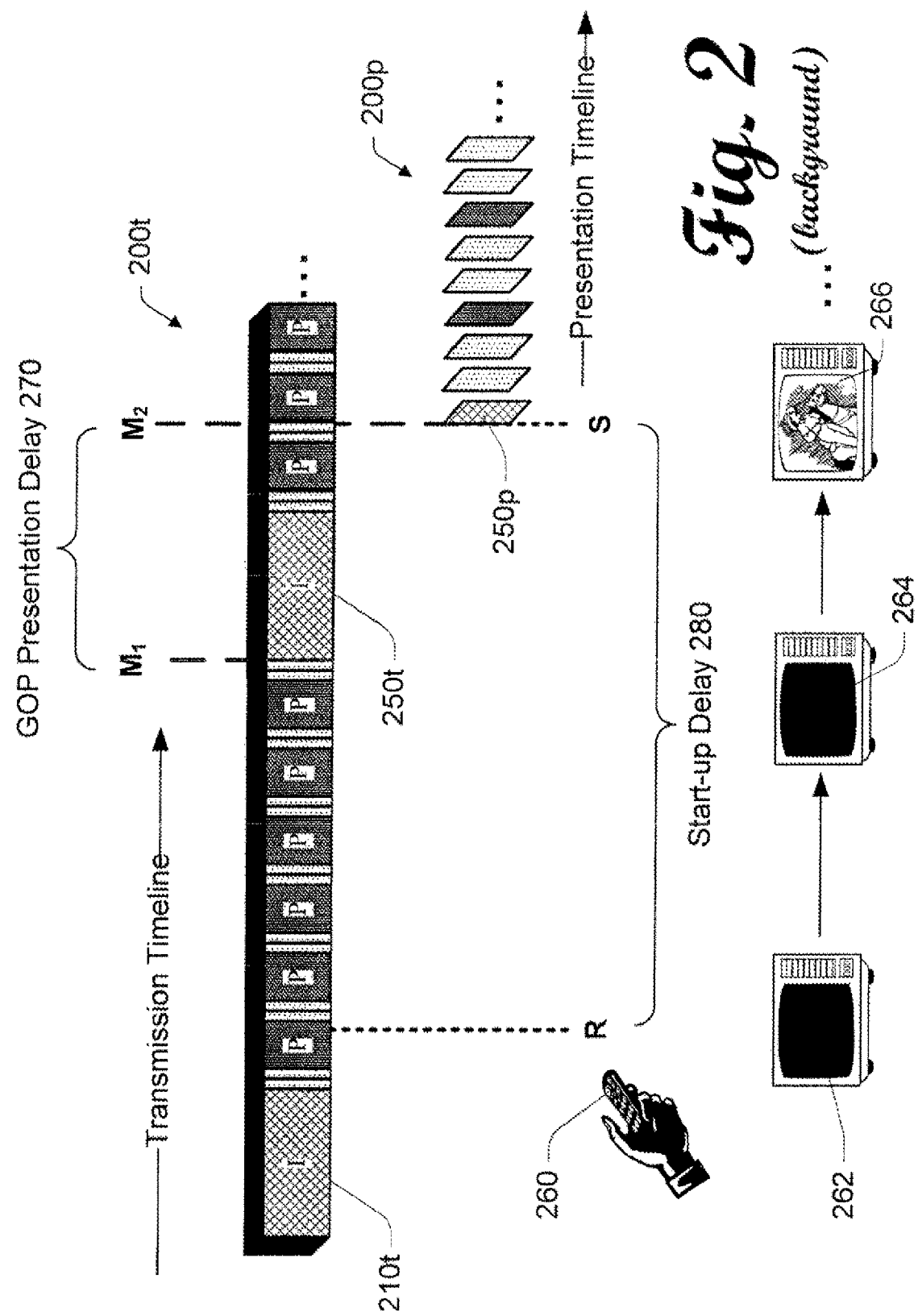
FIG. 2 is a diagram illustrating the presentation start-up delay using a typical video stream transmission timeline and its corresponding presentation timeline.

The normal sequence of events to change channels in a digital media multicast (or broadcast) environment typically includes the following actions of the receiver:

Tunes to the multicast (or broadcast) media stream.
Waits for reception of an access point into the stream. This is sometimes called a random access point (RAP).
Decodes the RAP.
Waits for presentation time of random access point to arrive (e.g., waiting for input buffer to be full enough)
Begins presenting frames in steady-state starting at the RAP This RAP is often a key-frame (e.g., I-frame in the MPEG vernacular). Since the user-perceived channel change typically cannot occur until a RAP of a multicast stream is received and decoded, the channel change times may be relatively lengthy. This delay is illustrated as the start-up delay 280 in FIG. 2.

Typical Unicast Network Communication Architecture

In a unicast (i.e., point-to-point) network communication architecture, a computing device (e.g., a video data server) sends a media stream with a RAP almost immediately upon receiving a request from a receiver. Therefore, the wait for a RAP of a unicast stream is substantially less than the wait for a RAP of a multicast stream. The receiver experiences little or no start-up delay with unicast.

However, a unicast network communication architecture typically consumes significantly more bandwidth and computing resources than a similarly configured multicast architecture. That is because the server is sending multiple copies of the same media stream to multiple recipients.

Operation of the Exemplary Media Stream Splicer

The exemplary stream splicer solves the problems of both approaches addressed above by switching from multicast to unicast when a receiver requests a new media stream and then switching back to multicast when it is ready.

Figure 3:
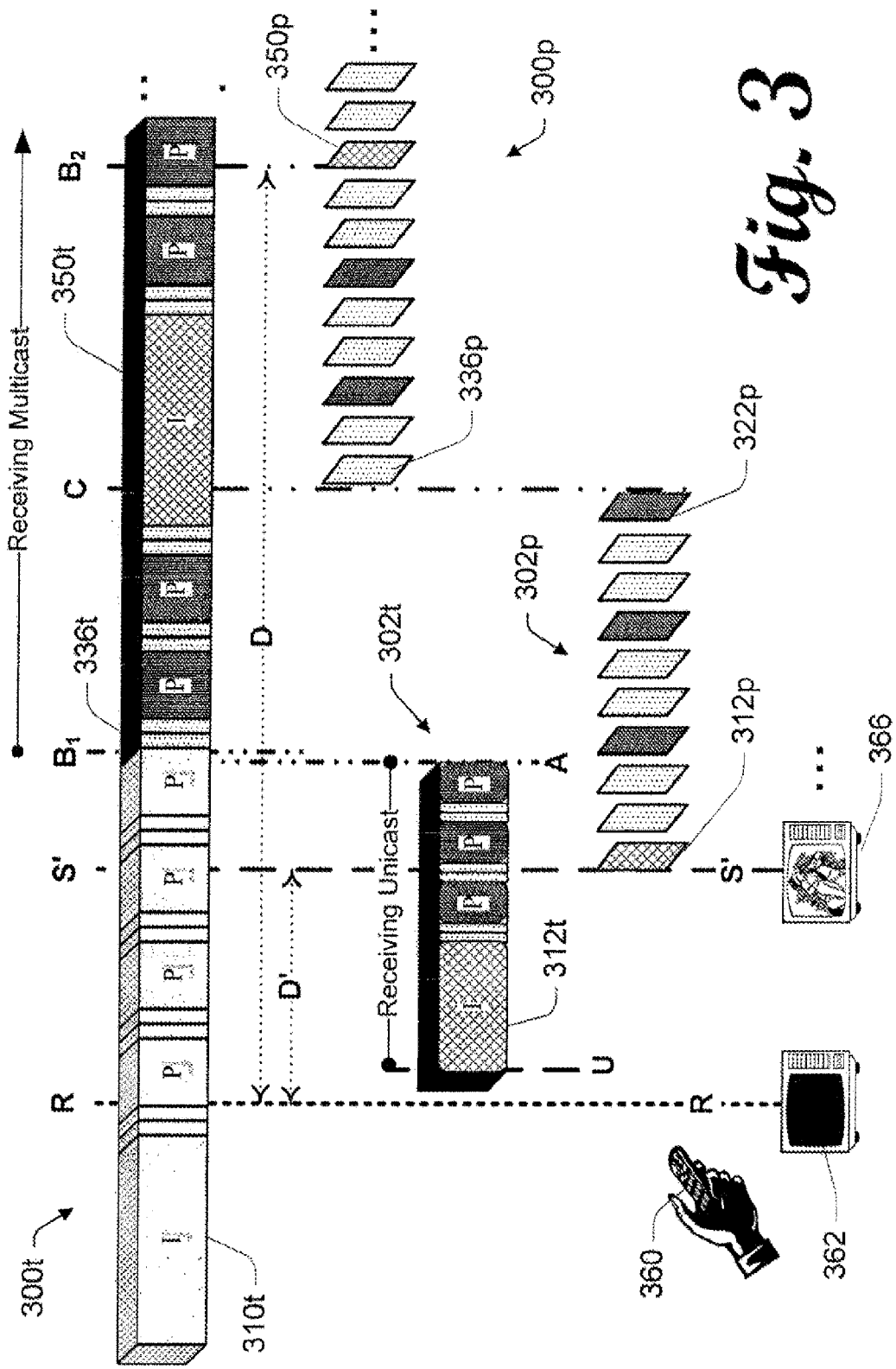
FIG. 3 is a diagram illustrating the new presentation start-up delay in accordance with an implementation, described herein, that employs a unicast media stream corresponding to a target multicast media stream.

As shown in FIG. 3, the exemplary stream splicer employs a target multicast media stream transmission 300*t* and a target unicast acquisition media stream (herein, the "unicast acquisition stream") transmission 302*t* to achieve a fast channel change time.

This unicast acquisition stream contains the same or nearly the same multimedia content as that of the target multicast stream. Furthermore, the content of the unicast acquisition stream is temporarily synchronized (or nearly so) with the target multicast stream. The unicast acquisition stream (such as 302*t*) typically begins with a RAP that is prior to or co-located with the current transmission point of the target multicast stream.

The frames to the left of $B_1$ of the target multicast transmission 300*t* are shown with light-grayed tones and represent portions of the multicast transmission that are never received by the exemplary stream splicer in the example illustration shown in FIG. 3. The frames to the right of $B_1$ of the target multicast transmission 300*t* are shown with full black tones and represent portions of the target multicast transmission that were received by the exemplary stream splicer after a channel change has occurred.

FIG. 3 also illustrates how this operation reduces the apparent video-stream presentation start-up delay-which is the effective delay experienced by the user. This start-up delay is the delay between the time a particular video stream is requested and the actual presentation of the first frame of a GOP.

Referring to FIG. 3, this example is explained. A GOP starting with I-frame 310*t* is transmitted in the target multicast stream 300*t*. However, the receiver wishes to tune into this media stream at request point R. This point represents when a channel change condition arises. This condition is typically in response to a user request (e.g., via a remote control 360).

Typically, the channel change condition occurs when either attempting to tune into any of the available channels for the first time or when actually attempting to change from one channel (which is currently being received) to another one. Either situation may be called "changing channels" (or the like) herein.

As illustrated in FIG. 3, this selection is illustrated as a user selecting a media-stream channel using a remote control 360. However, in a multicast environment, when this stream 300*t* is requested the receiver is not yet tuned in and the stream may not actually be transmitted to the receiver until some point after R.

Again, this is an example illustration for explanatory purpose. This point R could be at any moment in time within a GOP after its beginning (i.e., after the beginning of its I-frame 310*t*).

A conventional receiver typically waits for a RAP in order to access the multicast media stream. (In this example, each GOP is assumed to have one RAP.) An I-frame is an example of a typical RAP. So, a conventional receiver typically waits for the next I-frame (at the beginning of the next GOP transmission) before it can access the new multicast media-stream transmission and present the media.

With conventional approaches, the user would start seeing the media presentation (as shown in presentation timeline 300*p*) upon the presentation of the first I-frame 350*p* at point $B_2$. Therefore, the conventional presentation start-up delay (D) would be the difference between the request point (R) and point $B_2$. Written as an equation, that is $$D=B_2-R \quad [1]$$

Conventional Presentation Start-up Delay

When it changes channels, the exemplary stream splicer also requests the unicast acquisition stream. This stream corresponds to the target multicast media stream transmission. This stream also begins with a RAP that is prior to or co-located with the current point of the target multicast media stream transmission.

The channel change request (for eventually joining a multicast media stream) and the request for its unicast acquisition stream may be two separate requests made concurrently or nearly so. Alternatively, these two requests may be combined into a single request. Furthermore, the request for the unicast acquisition stream may be presumed by a request for the new multicast stream. Furthermore, the request for the multicast media stream may occur significantly after the request for the unicast acquisition stream.

Very quickly after making the request for a unicast acquisition stream, the exemplary stream splicer receives unicast acquisition stream transmission 302*t*. So, instead of waiting to receive the next RAP in the target multicast transmission 300*t*, as do conventional receivers, the exemplary stream splicer receives, decodes, and presents the unicast acquisition stream transmission 302*t* that corresponds to the target multicast stream.

It starts receiving this unicast transmission at point U. The RAP of unicast acquisition stream transmission 302*t* is I-frame 312*t*. Therefore, it decodes and presents the unicast acquisition stream presentation timeline 302*p* with presentation I-frame 312*p* at point S'. That presentation is represented by presentation timeline 302*p*.

The exemplary stream splicer continues to receive, decode, and present the unicast acquisition stream transmission 302*t* until it receives "triggering" data of the target multicast stream. The "triggering" data may be the first data of the target multicast stream received. Alternatively, it may be when the first RAP of the target multicast stream is received. Alternatively, it may be a message sent to the splicer. This typically depends upon the characteristics of the unicast acquisition stream and/or its frames.

For the purposes of the illustration shown in FIG. 3, the "triggering" data is the first data of the target multicast stream received by the exemplary stream splicer.

The Splicing Point

The switch-over from the unicast acquisition stream transmission 302t to the target multicast stream 300t occurs at the "splicing point," on or around points A and $B_1$ in FIG. 3.

The exemplary stream splicer seamlessly switches from decoding unicast acquisition stream data to decoding multicast at the transition ("splicing") point. This transition may occur at or shortly after the point that the target multicast stream is received.

As shown in FIG. 3, the exemplary stream splicer starts receiving the target multicast transmission 300t starting with data from packet 336t. This occurs at point $B_1$ in the target multicast transmission 300t in FIG. 3. Point A on the timeline represents the end of the reception of the last packet of the unicast acquisition stream transmission 302t.

An exaggerated and visible gap between these points is shown in FIG. 3 to illustrate that there is a clear opportunity for the exemplary stream splicer to join the target multicast stream. In reality, points A and $B_1$ may occur very nearly concurrently and may indeed be concurrent. It is possible in some embodiments to have a small overlap so that point A occurs shortly after point $B_1$.

Since the frame properties (e.g., resolution and image quality) and the frame sequencing of the unicast acquisition stream directly correspond and match those of the target multicast, this unicast-to-multicast switch (represented by points A and $B_1$) may occur at any point in the target multicast stream. There is no need to wait for a RAP in the target multicast stream to perform the switch. Also, there is no need for the splice to occur on a frame boundary; it may occur at any packet boundary.

Reduced Start-up Delay

To accomplish the switch-over, it may be desirable for the target multicast stream to be tagged for splicing. Alternatively, the RAP locations within the target multicast stream may be conveyed to the multicast router via some other mechanism.

Figure 4:
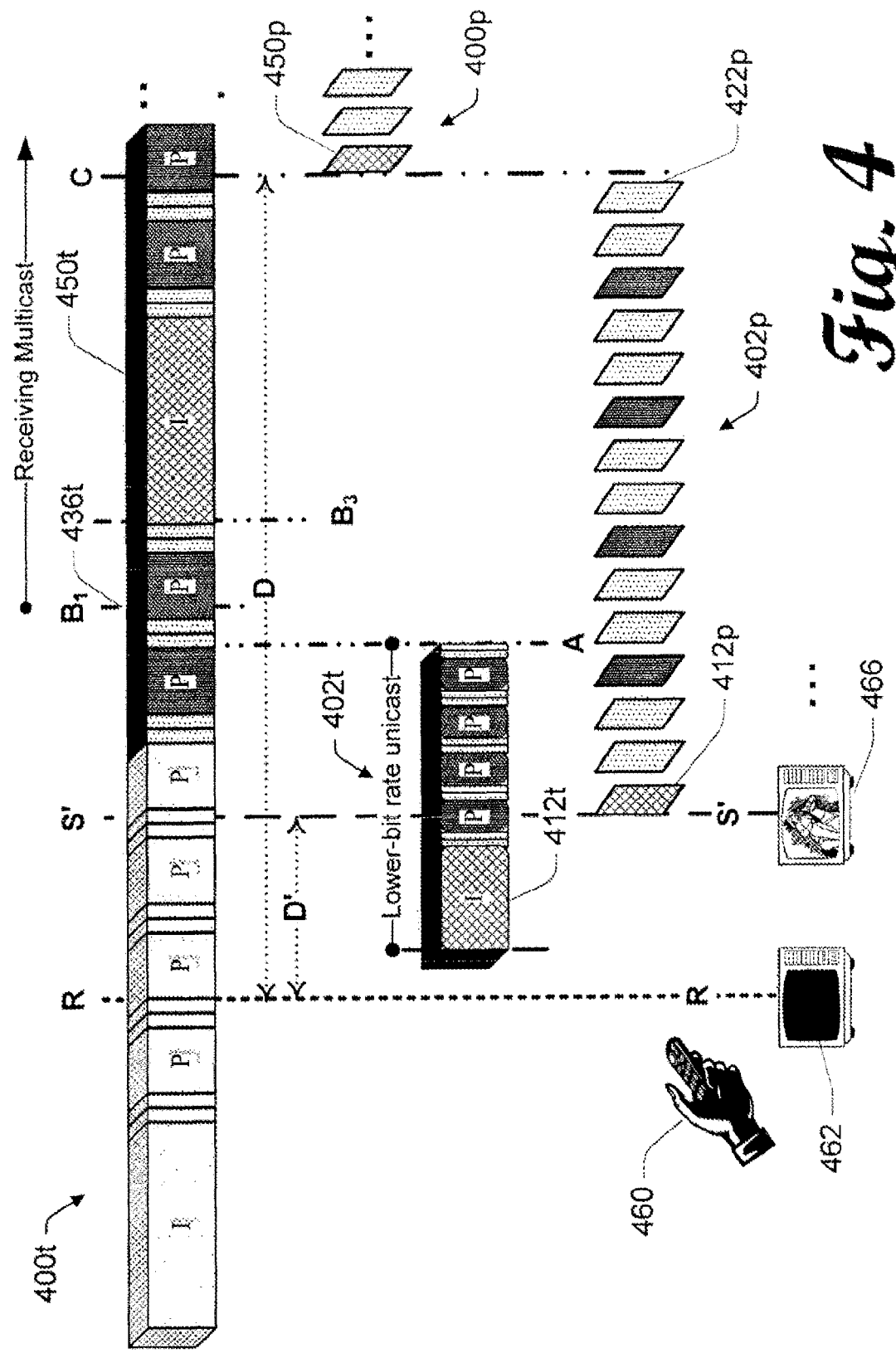
FIG. 4 is a diagram illustrating the new presentation start-up delay in accordance with another implementation, described herein, that employs a lower-bit-rate unicast media stream corresponding to a target multicast media stream.

As illustrated in FIG. 4, the exemplary stream splicer starts presenting target multicast presentation 400p beginning with frame 450p at point C. This starts immediately or very shortly after the presentation of the last frame (e.g., frame 422p) of the unicast acquisition stream presentation 402p. This presentation switch-over point is designated in FIG. 4 at point C.

As demonstrated by the screens 462 and 466, the start-up delay is the effective delay experienced by a user. The user selects a media-stream channel at request point R (using, for example, a remote 460) and sees a blank screen, as shown by screen 462. Of course, there may be information presented here (such as electronic programming information), but, since it is not yet the desired media-stream content, it is effectively blank.

At point S', screen 466 shows that the first image of frame 412p is presented to the user with the presentation I-frame 412p of the unicast acquisition stream.

With the exemplary stream splicer (whose operational effect is shown in FIG. 4), the user first experiences the presentation of the media content upon the presentation of the first I-frame 412p at point S'. Therefore, the new presentation start-up delay (D') is the difference between the request point (R) and presentation of the alternative stream at point S'. Expressed as an equation, that is $$D' = S' - R \qquad [2]$$

New Presentation Start-up Delay

The time-savings effected by the exemplary stream splicer is the difference between the D' and D. Using equations 1 and 2, that time-savings may be expressed as this equation:

$$D - D' = B_2 - S' \qquad [3]$$

Time-savings

With the exemplary stream splicer, the user experience is improved because the new start-up delay (D') is less than the conventional start-up delay (D) (i.e., D'<D). The exemplary stream splicer improves the user's experience by decreasing the effective start-up delay as compared to the delay experienced using conventional approaches.

Operation of the Exemplary Media Stream Splicer with Lower Bit-Rate Unicast Acquisition Stream There are some instances where little or no spare bandwidth is available for a unicast acquisition stream with frame properties (e.g., resolution and image quality) that match the target multicast. In those instances, the exemplary stream splicer may employ a lower bit-rate than the target multicast stream does.

The unicast acquisition stream may be low bit-rate so that its transmission consumes less bandwidth than otherwise. Herein, the concept of "low bit-rate" is in terms of number of bits per picture (i.e., frame). The stream may be a normal bit-rate in terms of the number of bits sent per second.

To achieve fast channel changing without lower-bit-rate streams, the exemplary stream splicer would require momentarily higher-than-normal bit-rate as a receiver changes to another channel. However, some network connections are not able to provide this higher-than-normal bit-rate.

A sequence of frames has an inherent bit-rate. This bit-rate can be calculated by looking at the schedule of the sequence of frames, including their sizes. This inherent bit-rate is not necessarily the same bit-rate at which the sequence of frames is sent. A sequence of frames can have a lower-than-normal inherent bit-rate but be sent at a normal bit-rate.

So, in order to achieve fast channel change in an environment where it is not desirable to exceed the normal bit-rate, the exemplary stream splicer sacrifices initial media quality during the unicast acquisition stream.

There are two implementations that use a lower-bit rate unicast acquisition stream. For one of them, the server sends the exemplary stream splicer a single unicast acquisition stream having a low-inherent-bit-rate (which may be represented by 402t of FIG. 4). For another, the server first sends the exemplary stream splicer a unicast acquisition stream having a low-inherent-bit-rate (which may be represented by 502t of FIG. 5) followed thereafter with an intermediate unicast stream having a normal-inherent-bit-rate rate (which may be represented by 504t).

The reception of the low bit-rate unicast acquisition stream may occur at a normal bit-rate. The exemplary stream splicer decodes and presents the unicast acquisition stream.

Since the unicast acquisition stream contains low-inherent-bit-rate frames, it waits until the next received RAP of the target multicast stream (or of the unicast intermediate stream) for the switch to occur. This splice may happen at the packet level, rather than at the frame level.

This approach has the added advantage that instead of requiring a target-stream-GOP worth of extra buffering, the receiver would only need a channel-acquisition-stream (i.e., unicast acquisition stream) GOP worth of extra buffering; therefore, if a GOP in the channel acquisition stream is made to be fairly short, the amount of extra buffering required to achieve fast channel change is reduced.

Splice from Low Bit-Rate Unicast Acquisition Stream to Multicast Stream

As shown in FIG. 4, this implementation employs a single unicast acquisition stream 402t having a low-inherent-bit-rate that transitions on the transmission timeline to the target multicast stream 400t at or before the boundary of a RAP 450*t*. The presentation timeline splice occurs exactly at frame 450*t*. Any packets received from the multicast before frame 450*t* are discarded.

As shown in FIG. 4, the exemplary stream splicer begins receiving target multicast transmission 400*t* starting with data from packet 436*t*. This occurs at point $B_1$ in the target multicast transmission 400*t*. However, the exemplary stream splicer does not immediately switch over to presentation of the target multicast stream.

The reception splicing point occurs at and around points A and $B_1$ as illustrated in FIG. 4. Point A on the timeline represents the end of the reception of the last frame of the unicast acquisition stream transmission 402*t*. As shown in FIG. 4, the exemplary stream splicer starts receiving the first RAP (e.g., I-frame 450*t*) of the target multicast transmission 400*t*. This occurs at point $B_3$ in the target multicast transmission 400*t*.

Like in FIG. 3, an exaggerated and visible gap between these points is shown in FIG. 4 to illustrate that there is a clear opportunity for the exemplary stream splicer to join the target multicast stream. In reality, points A and $B_3$ may occur very nearly concurrently and may indeed be concurrent. It is possible in some embodiments to have a small overlap so that point A occurs shortly after point $B_3$.

The frame properties (e.g., resolution and image quality) of the unicast acquisition stream differ from that of the target multicast. As a result, the presentation splice into the multicast must occur at a RAP.

At point C of FIG. 4, the exemplary stream splicer starts presenting target multicast presentation 400*p* beginning with the frame 450*p*, which is a RAP. This starts immediately, or very nearly after the presentation of the last frame (e.g., frame 422*p*) of the unicast acquisition stream presentation 402*p*.

As demonstrated by the screens 462 and 466, the start-up delay is short. The user selects a media-stream channel at request point R and sees a blank screen, as shown by screen 462. Not long after that, the user sees moving multimedia presentation, as represented by screen 466.

This approach has the added advantage that instead of requiring a target-stream-GOP worth of extra buffering at the target stream rate, the receiver would only need a channel-acquisition-stream (i.e., unicast acquisition stream) GOP worth of extra buffering at the main stream rate; therefore, a GOP in the channel acquisition stream can be fairly short.

Splice Using a Normal Bit-Rate Unicast Intermediate Stream

Figure 5:
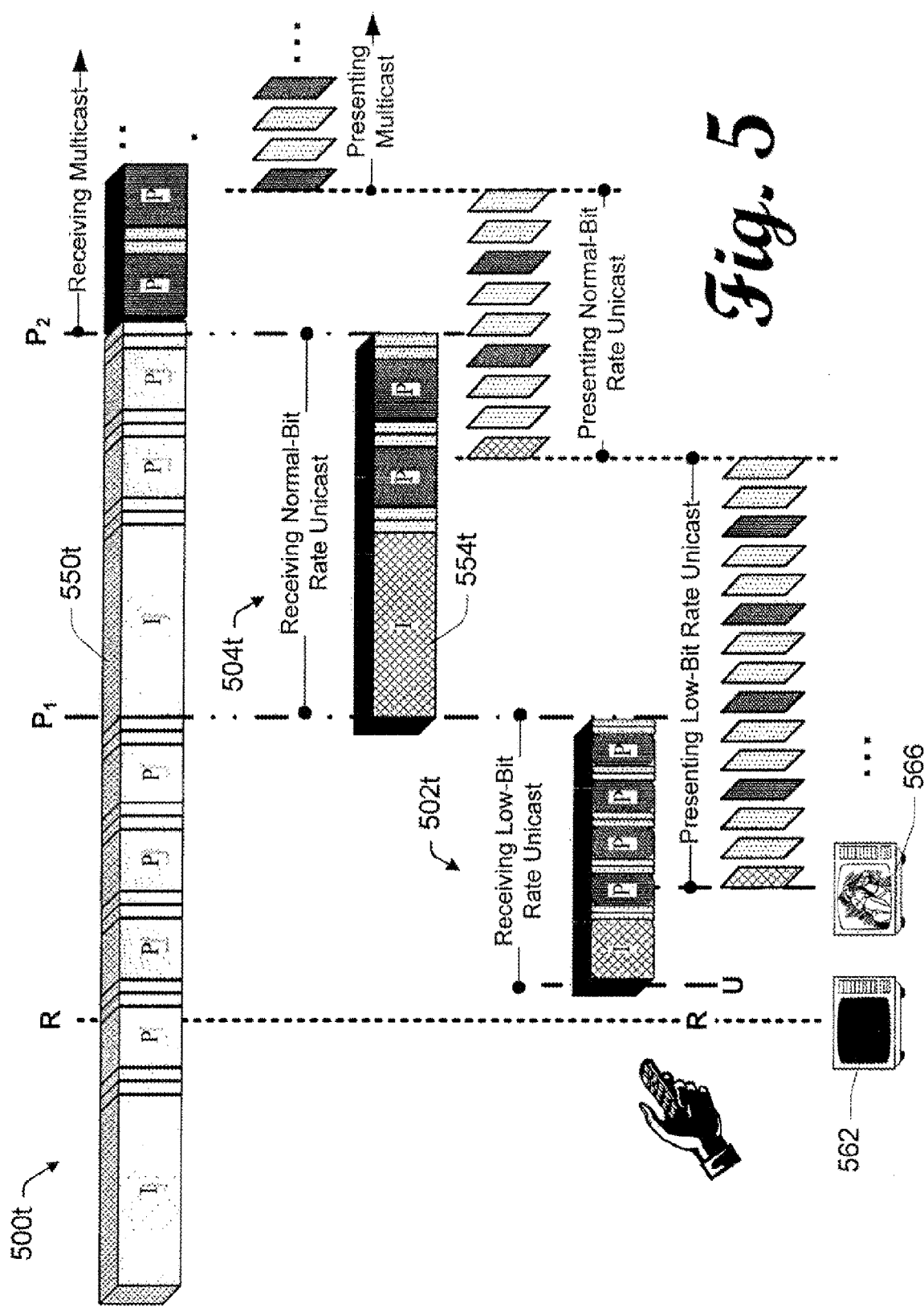
FIG. 5 is a diagram illustrating the new presentation start-up delay in accordance with another implementation, described herein, that employs two unicast media streams (one of them being lower bit-rate) corresponding to a target multicast media stream.

As shown in FIG. 5, this implementation employs two unicast streams. One is at low-bit rate and the other is at a normal bit-rate. The reason for using this implementation (rather than the one with just one low-bit rate unicast stream) is to separate the frame-level splice from the packet level splice. The unicast stream sender effects the frame-level unicast-to-unicast splice, and the exemplary media stream splicer effects the packet-level unicast-to-multicast splice.

Rather than changing both bit-rate (low to normal) and communication type (unicast to multicast) at one splice point, they are spread over two splice points. One splice point $P_1$ is for transitioning from low to normal bit-rate. The next point $P_2$ is for transitioning from unicast to multicast.

The first is a unicast acquisition stream 502*t* having a low-inherent-bit-rate. The other is a unicast intermediate stream 504*t* having a normal-inherent-bit-rate. The exemplary stream splicer first transitions from the low bit-rate acquisition stream 502*t* to the normal bit-rate intermediate stream 504*t* at a point in time that is at or around the beginning of RAP 550*t* in the ongoing multicast.

Once the exemplary stream splicer starts receiving the target multicast stream 500*t*, it transitions from the intermediate stream 504*t* to the target multicast stream. This transition need not happen at a RAP boundary.

The first transmission splicing point for the transition from the low bit-rate acquisition stream 502*t* to the normal bit-rate intermediate stream 504*t* is at point $P_1$.

The frame properties (e.g., resolution and image quality) of the unicast acquisition stream 502*t* differ from that of the intermediate unicast stream 504*t*. This transition at point Pi occurs at a RAP (e.g., I-frame 554*t*) of the intermediate unicast stream 504*t*. The transmission and reception transition occurs at or before the beginning of this RAP. The presentation transition occurs at this RAP.

Although it is not shown here at point $P_1$, there may be a small gap or overlap between the reception of the last data of the unicast acquisition stream 502*t* and the first data of the unicast intermediate stream 504*t*.

Notice that the unicast intermediate stream 504*t* is approximately synchronized with the target multicast stream 500*t*. Doing this aids in quick and seamless splice from the intermediate to the target stream.

The exemplary stream splicer will continue to receive the normal bit-rate intermediate unicast stream 504*t* until it is ready to receive the target multicast stream 500*t*. Since both are normal bit-rate and the splicer cannot maintain reception of both for long, this transition should take place soon after the splicer starts to receive the multicast stream.

This next splicing point for the transition from reception of the normal bit-rate intermediate stream 504*t* to reception of the target multicast stream 500*t* is at or around point $P_2$.

The frame properties (e.g., resolution and image quality) of the unicast intermediate stream 504*t* match those of the target multicast stream 500*t*. Therefore, this transition at point $P_2$ need not occur on a RAP boundary. This transition may occur at the packet level.

Although it is not shown here at point $P_2$, there may be a small gap or overlap between the reception of the last packet of the unicast intermediate stream 504*t* and the first packet of the target stream 500*t*.

As demonstrated by the screens 562 and 566, the start-up delay is short. The user selects a media-stream channel at request point R and sees a blank screen, as shown by screen 562. Not long after that, the user sees moving multimedia presentation, as represented by screen 566.

Methodological Implementations of the Exemplary Media Stream Splicer

Figure 6:
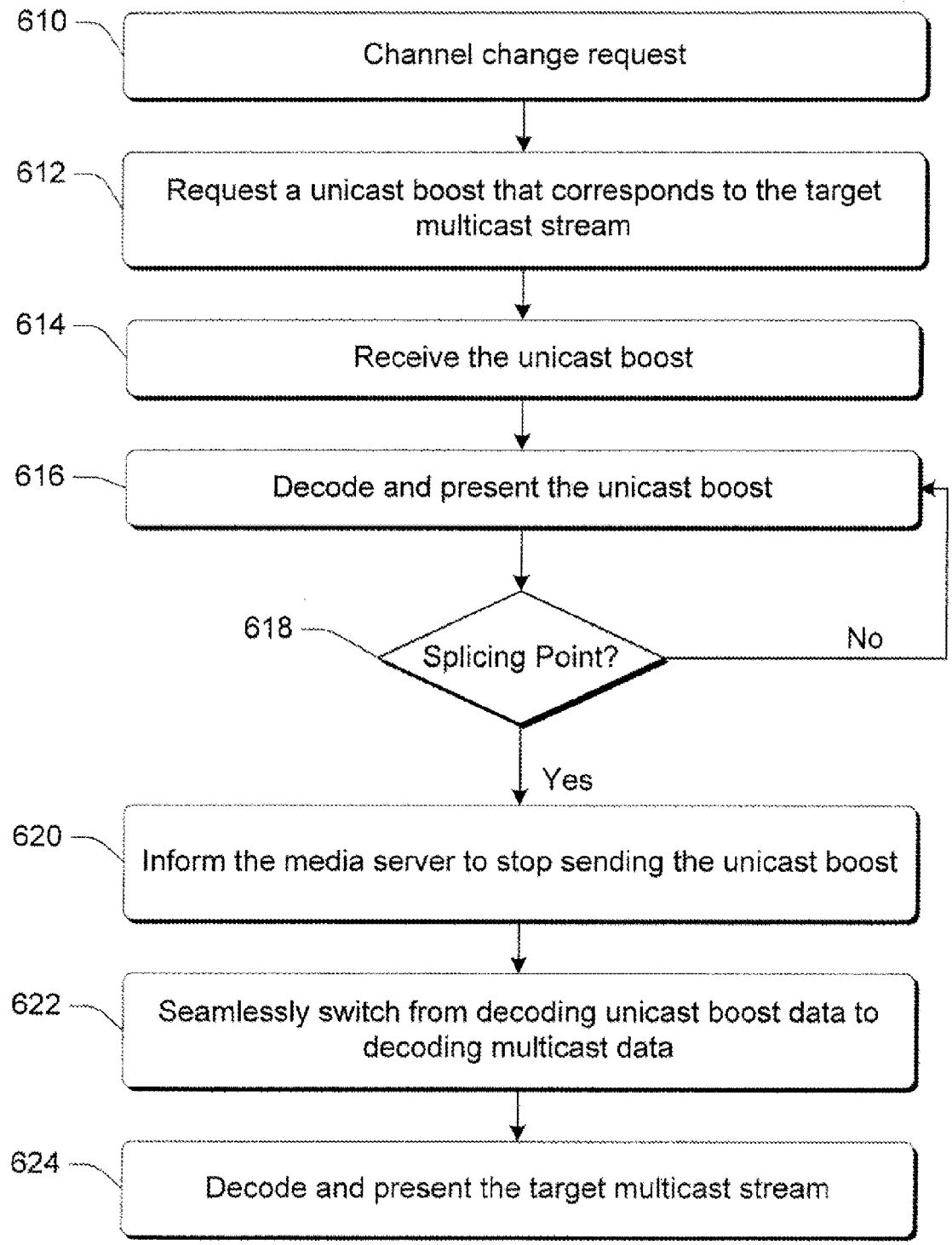
FIG. 6 is a flow diagram showing a methodological implementation described herein.

FIG. 6 shows a methodological implementation of the exemplary stream splicer. The implementation is performed to effect a smooth and quick channel change. These methodological implementations may be performed in software, hardware, or a combination thereof.

At 610 of FIG. 6, the exemplary stream splicer receives a request to tune to a target multicast media stream. In other words, another channel is to be tuned in. This may be at the request of the user.

At 612, the exemplary stream splicer requests a unicast acquisition stream.

At 614, the exemplary stream splicer receives the unicast acquisition stream.

At 616, the exemplary stream splicer decodes and presents the unicast acquisition stream, starting at the RAP at the beginning of the unicast acquisition stream.

At 618, it receives multicast stream. It continues with actions of block 616 until it is at the "splicing point.". At that point, the exemplary stream splicer proceeds to block 620.

Where the spicing point is may depend upon the properties (such as bit-rate) of the unicast acquisition stream compared to those of the target multicast stream. For example, the unicast acquisition stream may have the same frame properties (such as bit-rate) of those of the target multicast stream. If so, then the exemplary stream splicer may splice into the target multicast stream as soon as it receives data of the multicast stream and may do so at the packet level.

Alternatively, it may wait to splice until it receives some amount or some type of data in the target multicast stream. For example, if the frame properties (such as bit-rate) of the unicast acquisition stream differ from those of the target multicast stream, then the exemplary stream splicer may wait until it receives the first RAP of the multicast stream before splicing.

At 620 of FIG. 6, the exemplary stream splicer informs the media server (which is sending the media streams) to stop sending the unicast acquisition stream.

At 622, the exemplary stream splicer seamlessly switches from decoding unicast acquisition stream data to decoding multicast data.

At 624, the target multicast stream is decoded and presented.

As a result of the above, the receiver will end up in a steady-state, presenting frames somewhat late compared to the normal multicast presentation position, and so the receiver will require enough extra memory to hold the additional compressed media data relative to a normal multicast-only or broadcast-only receiver.

Alternatively, there may be two splicing points for the implementation utilizing a low bit-rate acquisition stream and an intermediate stream (as discussed above and shown in FIG. 5).

Figure 7:
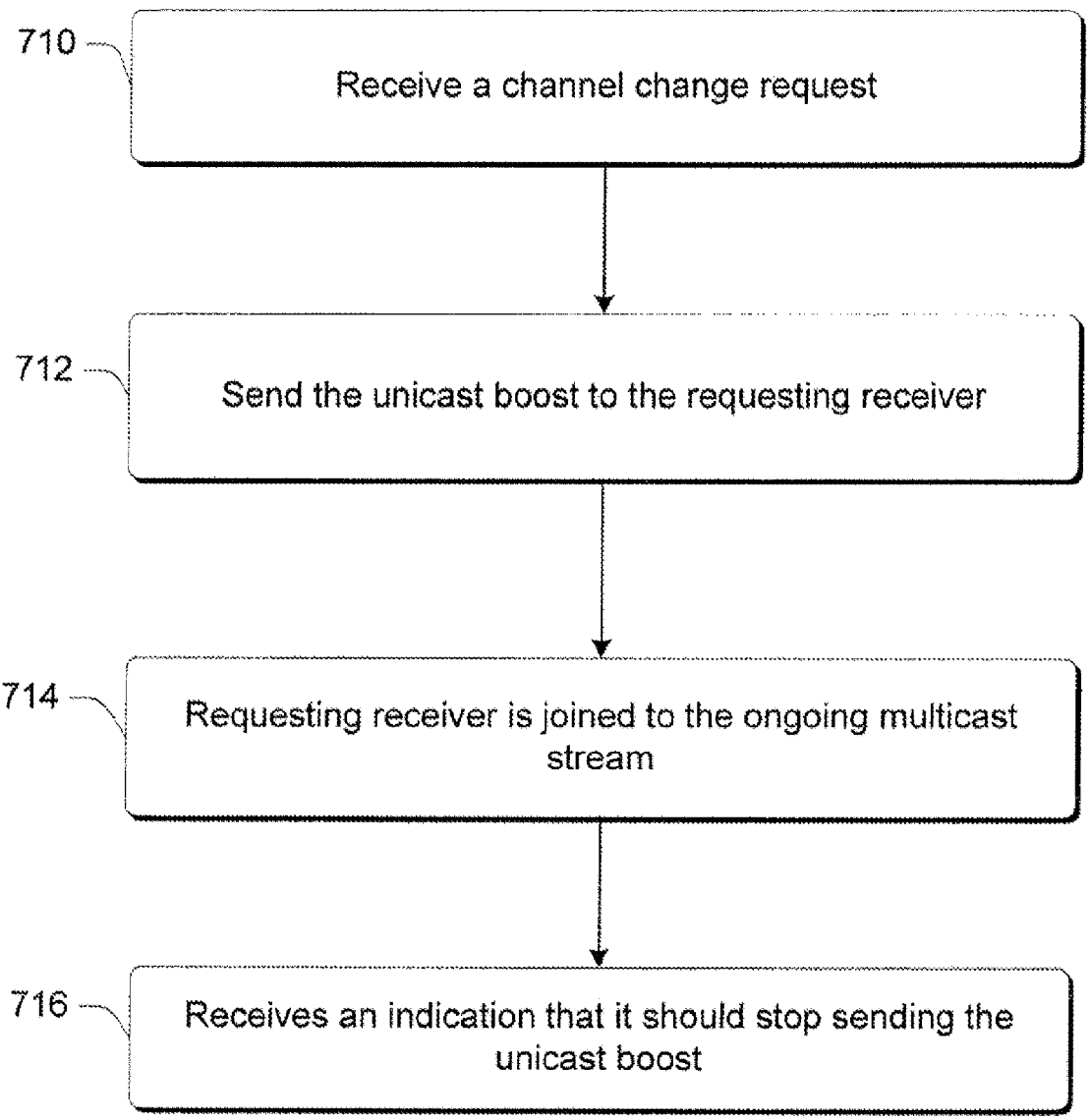
FIG. 7 is a flow diagram showing a methodological implementation described herein.

Another Methodological Implementation Facilitating the Exemplary Media Stream Splicer FIG. 7 shows a methodological implementation facilitating the exemplary stream splicer. The implementation is performed to effect a smooth and quick channel change. These methodological implementations may be performed in software, hardware, or a combination thereof.

At 710 of FIG. 7, a server computing device receives a request to tune to a target multicast media stream. In other words, a channel change request is made by the receiver. Accompanying this request is a request for a unicast acquisition stream. Alternatively, the unicast-acquisition-stream request may be incorporated into the channel-change request. Alternatively still, the unicast-acquisition-stream request may be simply inferred by the channel-change request.

At 712, the server sends the unicast acquisition stream to the requesting receiver.

At 714, the requesting receiver is joined to the ongoing multicast stream.

Furthermore, the unicast acquisition stream may have the same frame properties (such as bit-rate) of those of the target multicast stream. Alternatively, the frame properties (such as bit-rate) of the unicast acquisition stream may differ from those of the target multicast stream. Alternatively still, the server may have access to both types of unicast acquisition streams and then send the type which is appropriate given the limitations of the communications network.

At 716 of FIG. 7, the server receives from the exemplary stream splicer an indication that it should stop sending the unicast acquisition stream.

Exemplary Environment

Figure 8:
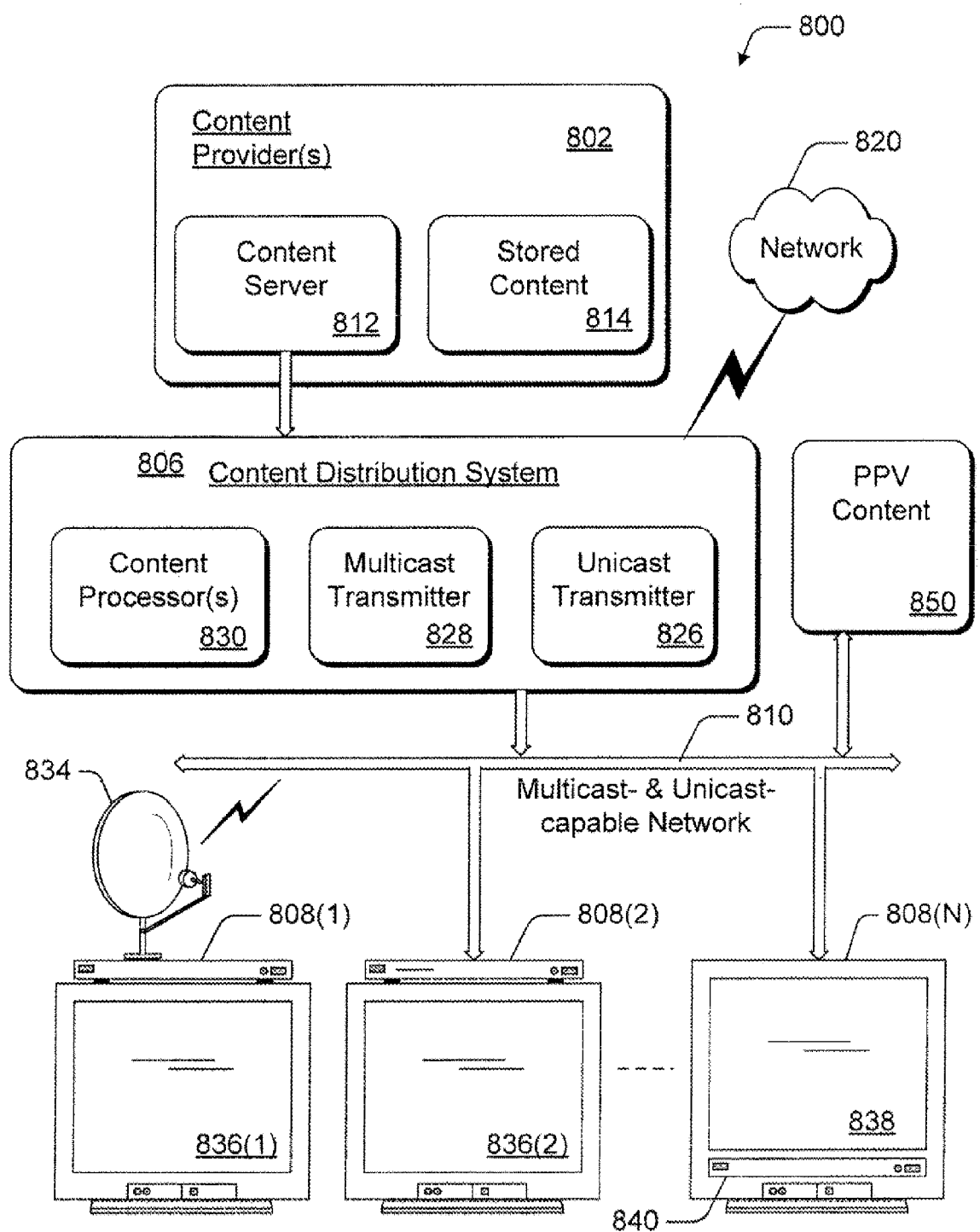
FIG. 8 illustrates an exemplary environment in which an implementation described herein may be employed.

FIG. 8 illustrates an exemplary environment 800 in which the techniques, systems, and other aspects described herein may be implemented (partially or wholly). Exemplary environment 800 is a television entertainment system that facilitates distribution of multimedia.

The environment 800 includes one or more multimedia content providers 802, a content distribution system 806, and one or more presentation devices 808(1), 808(2), . . . , 808(N) coupled to the content distribution system 806 via a multicast- & unicast-capable network 810.

Multimedia content provider 802 includes a content server 812 and stored content 814, such as movies, television programs, commercials, music, and similar audio and/or video content. Content server 812 controls distribution of the stored content 814 from content provider 802 to the content distribution system 806. Additionally, content server 802 controls distribution of live content (e.g., content that was not previously stored, such as live feeds) and/or content stored at other locations to the content distribution system 806.

Content distribution system 806 may be coupled to a network 820, such as an intranet or the Internet. The content distribution system 806 includes a unicast transmitter 826, a multicast transmitter 828, and one or more content processors 830. Unicast transmitter 826 multicasts signals across the multicast- & unicast-capable network 810. Multicast transmitter 828 multicasts signals across the multicast- & unicast-capable network 810.

Content distribution system 806 is representative of a headend service that provides multimedia content to multiple subscribers.

Multicast- & unicast-capable network 810 can include a cable television network, RF, microwave, satellite, and/or data network, such as the Internet, and may also include wired or wireless media using any multicast format or multicast protocol. Additionally, multicast- & unicast-capable network 810 may be any type of network, using any type of network topology and any network communication protocol, and may be represented or otherwise implemented as a combination of two or more networks.

Content processor 830 processes the content received from content provider 802 prior to transmitting the content across multicast- & unicast-capable network 808. A particular content processor 830 may encode, or otherwise process, the received content into a format that is understood by the multiple presentation devices 808(1), 808(2), and 808(N) coupled to multicast- & unicast-capable network 810.

Presentation devices 808 may be implemented in a number of ways. For example, a presentation device 808(1) receives content from a satellite-based transmitter via a satellite dish 834. Presentation device 808(1) is also referred to as a set-top box or a satellite receiving device. Presentation device 808(1) is coupled to a television 836(1) for presenting the content received by the presentation device (e.g., audio data and video data), as well as a graphical user interface. A particular presentation device 808 may be coupled to any number of televisions 836 and/or similar devices that may be implemented to display or otherwise render content. Similarly, any number of presentation devices 808 may be coupled to a single television 836.

Presentation device 808(2) is also coupled to receive content from multicast- & unicast-capable network 810 and provide the received content to associated television 836(2). Presentation device 808(N) is an example of a combination television 838 and integrated set-top box 840. In this example, the various components and functionality of the set-top box are incorporated into the television, rather than using two separate devices. The set-top box incorporated into the television may receive signals via a satellite dish or wireless antenna (such as dish 834) and/or via multicast- & unicast-capable network 810. In alternate implementations, presentation devices 806 may receive content via the Internet or any other multicast or unicast medium.

The exemplary environment 800 also includes live or stored pay-per-view (PPV) content 750, such as PPV movie content. The stored or live content is typically multicast on a schedule. When a device joins a PPV multicast channel, the PPV content may be viewed with a presentation device 808.

Exemplary Presentation Device

Figure 9:
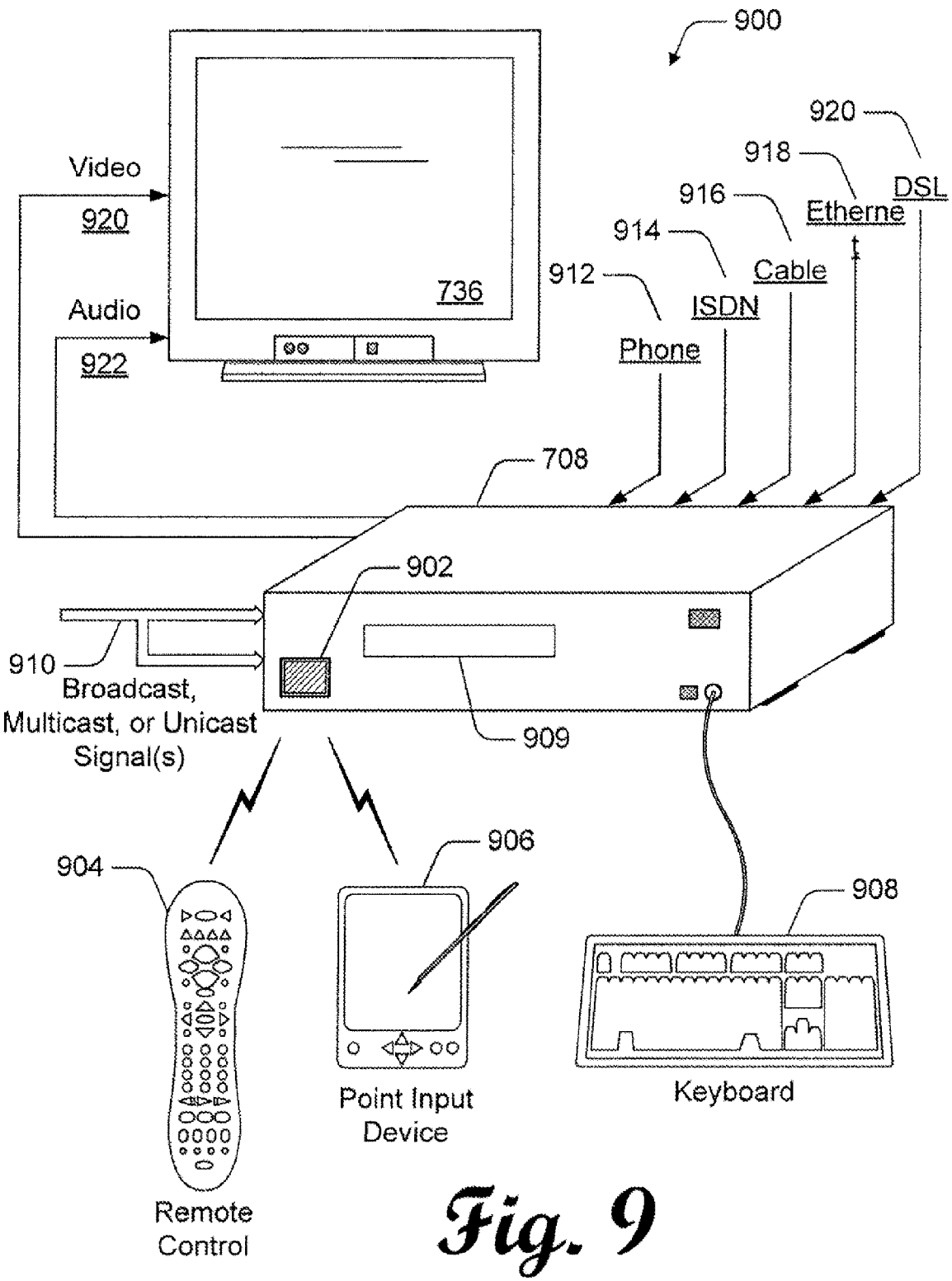
FIG. 9 illustrates an example presentation device, a television, and various input devices that interact with the presentation device.

FIG. 9 illustrates an exemplary implementation 900 of a presentation device 808 shown as a standalone unit that connects to a television 836. Presentation device 808 may be implemented in any number of embodiments, including as a set-top box, a satellite receiver, a TV recorder with a hard disk, a game console, an information appliance, a DVD player, a personal video recorder, a personal computer, a home media center, a modem, and so forth.

Presentation device 808 includes a wireless receiving port 902, such as an infrared (IR) or Bluetooth wireless port, for receiving wireless communications from a remote control device 904, a handheld input device 906, or any other wireless device, such as a wireless keyboard. Handheld input device 906 may be a personal digital assistant (PDA), handheld computer, wireless phone, or the like. Additionally, a wired keyboard 908 is coupled to communicate with the presentation device 808. In alternate embodiments, remote control device 904, handheld device 906, and/or keyboard 908 may use an RF communication link or other mode of transmission to communicate with presentation device 808.

Presentation device 808 may have a storage medium reader 909 for reading content storage media, such as DVD disks. A standalone or non-standalone presentation device 808 may include the storage medium reader 909.

Presentation device 808 may receive one or more multicast signals 910 from one or more multicast sources, such as a multicast network. Also, it may receive one or more unicast signals 910 from one or more unicast sources, such as a unicast network.

Presentation device 808 also includes hardware and/or software for providing the user with a graphical user interface with which the user can, for example, access various network services, configure the presentation device 808, and perform other functions.

Presentation device 808 may be capable of communicating with other devices via one or more connections including a conventional telephone link 912, an ISDN link 914, a cable link 916, an Ethernet link 918, a DSL link 920, or the like. Presentation device 808 may use any one or more of the various communication links 912-920 at a particular instant to communicate with any number of other devices. The multicast signals may also be received via the various communication links 912-920.

Presentation device 808 generates video signal(s) 920 and audio signal(s) 922, both of which are communicated to television 836. Alternatively, video and audio signal(s) may be communicated to other audio/visual equipment, such as speakers, a video monitor, a home theater system, an audio system, and the like.

Although not shown in FIG. 9, presentation device 808 may include one or more lights or other indicators identifying the current status of the device. Additionally, the presentation device may include one or more control buttons, switches, or other selectable controls for controlling operation of the device.

Figure 10:
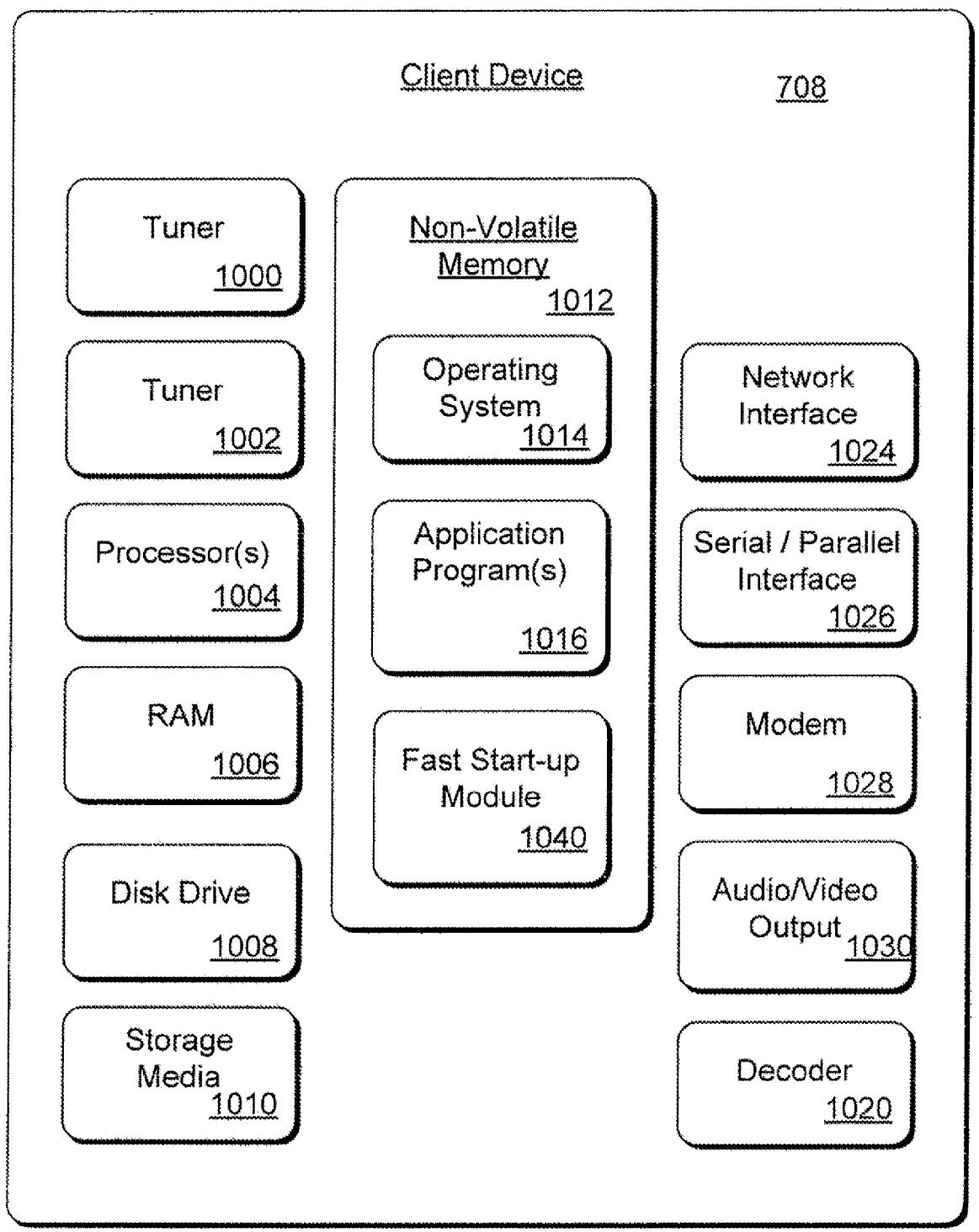
FIG. 10 is a block diagram that illustrates components of the example presentation device(s) shown in FIGS. 8 and 9.

FIG. 10 illustrates selected components of presentation device 808 shown in FIGS. 8 and 9. Presentation device 808 includes a first tuner 1000 and an optional second tuner 1002. The tuners 1000 and 1002 are representative of one or more in-band tuners that tune to various frequencies or channels to receive television signals, as well as an out-of-band tuner or receiver or network interface card that tunes to or receives the multicast communications channel over which other content may be multicast to presentation device 808.

The tuners 1000 and 1002 may be digital tuners, analog tuners, or any combination of analog and digital components used to get digital data into the client device 708.

Presentation device 808 also includes one or more processors 904 and one or more memory components. Examples of possible memory components include a random access memory (RAM) 1006, a disk drive 1008, a mass storage component 1010, and a non-volatile memory 1012 (e.g., ROM, Flash, EPROM, EEPROM, etc.).

Alternative implementations of presentation device 808 can include a range of processing and memory capabilities, and may include more or fewer types of memory components than those illustrated in FIG. 10.

Processor(s) 1004 process various instructions to control the operation of presentation device 808 and to communicate with other electronic and computing devices. The memory components (e.g., RAM 1006, disk drive 1008, storage media 1010, and non-volatile memory 1012) store various information and/or data such as multimedia content, electronic program data, web content data, configuration information for presentation device 808, and/or graphical user interface information. The device may cache data into any one of these many memory components.

An operating system 1014 and one or more application programs 1016 may be stored in non-volatile memory 1012 and executed on processor 1004 to provide a runtime environment. A runtime environment facilitates extensibility of presentation device 808 by allowing various interfaces to be defined that, in turn, allow application programs 1016 to interact with presentation device 808.

The application programs 1016 that may be implemented on the presentation device 808 may include an electronic program guide (EPG), an email program to facilitate electronic mail, and so on.

Presentation device 808 can also include other components pertaining to a television entertainment system, which are not illustrated in this example for simplicity purposes. For instance, presentation device 808 can include a user interface application and user interface lights, buttons, controls, etc. to facilitate viewer interaction with the device.

Serial and/or parallel interface 926 and network interface 1024 allow presentation device 808 to interact and communicate with other electronic and computing devices via various communication links. Although not shown, presentation device 808 may also include other types of data communication interfaces to communicate with other devices.

Presentation device 708 may include a modem 1028 or other communications device that facilitates communication with other electronic and computing devices via a conventional telephone line or other communications mediums.

The presentation device 808 has the ability to receive multicast digital data and it may receive it using the tuners 1000 or 1002, the network interface 1024, the modem 1028, or other communications device. It also has the ability to receive unicast digital data and it may receive it using the tuners 1000 or 1002, the network interface 1024, the modem 1028, or other communications device.

Presentation device 808 also includes an audio/video output 1030 that provides signals to a television or other device that processes and/or presents or otherwise renders the audio and video data. This output may be called the display.

Presentation device 808 also includes a fast start-up module 1040 that partially or wholly implements the exemplary stream splicer. It may be an application program or a hardware component.

Although shown separately, some of the components of presentation device 808 may be implemented in an application specific integrated circuit (ASIC). Additionally, a system bus (not shown) typically connects the various components within presentation device 808.

A system bus may be implemented as one or more of any of several types of bus structures, including a memory bus or memory controller, a peripheral bus, an accelerated graphics port, or a local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus also known as a Mezzanine bus.

Exemplary Computing System and Environment

Figure 11:
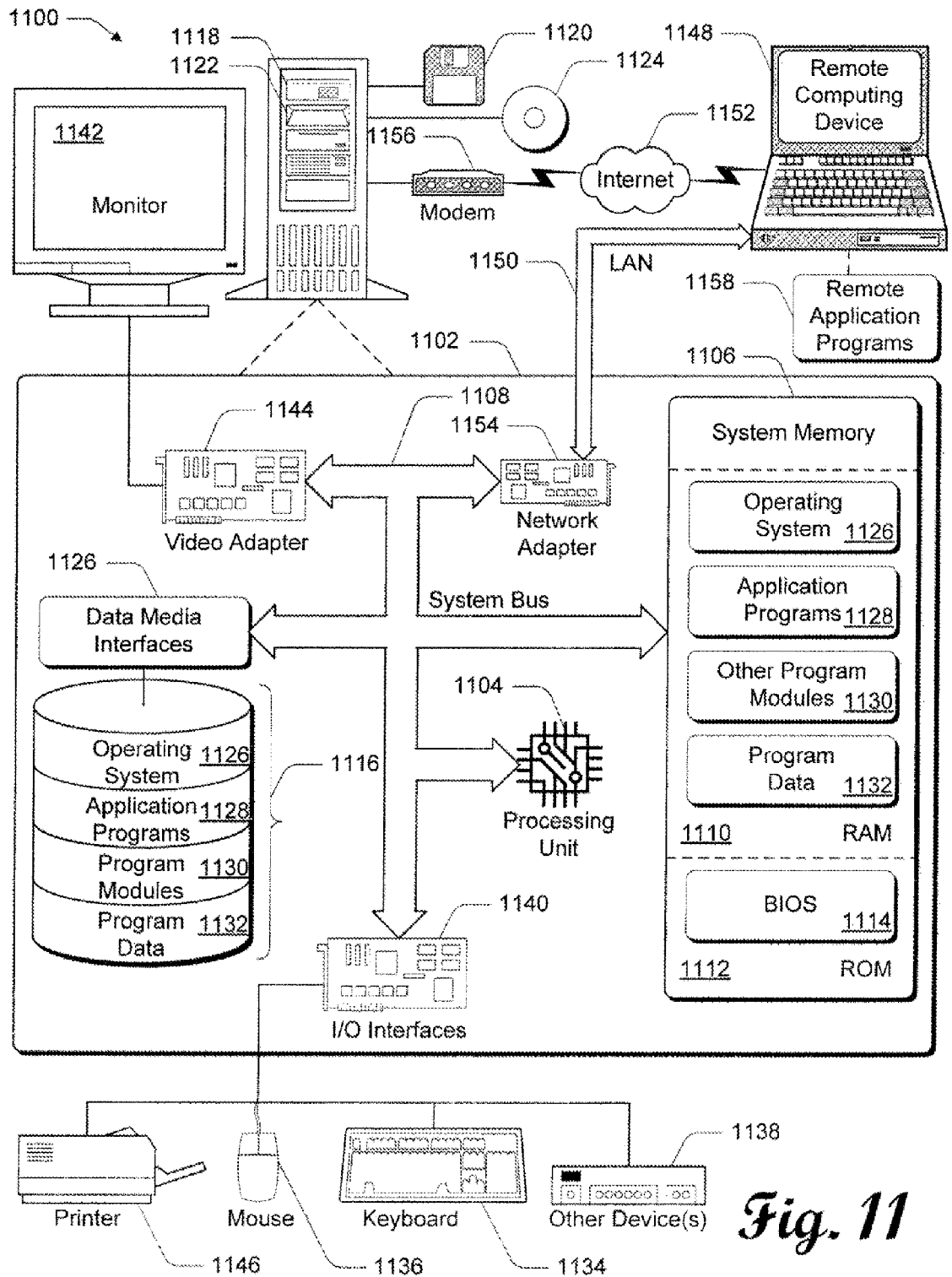
FIG. 11 is an example of a computing operating environment capable of (wholly or partially) implementing at least one embodiment described herein.

FIG. 11 illustrates another example of a suitable computing environment 1100 within which an exemplary stream splicer, as described herein, may be implemented (either fully or partially). The computing environment 1100 may be utilized in the computer and network architectures described herein.

The exemplary computing environment 1100 is only one example of a computing environment and is not intended to suggest any limitation as to the scope of use or functionality of the computer and network architectures. Neither should the computing environment 1100 be interpreted as having any dependency or requirement relating to any one or combination of components illustrated in the exemplary computing environment 1100.

The exemplary stream splicer may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary stream splicer may be described in the general context of processor-executable instructions, such as program modules, being executed by a processor. Generally, program modules include routines, programs, objects, components, data structures, etc. that perform particular tasks or implement particular abstract data types. The exemplary stream splicer may also be practiced in distributed computing environments where tasks are performed by remote processing devices that are linked through a communications network. In a distributed computing environment, program modules may be located in both local and remote computer storage media including memory storage devices.

The computing environment 1100 includes a general-purpose computing device in the form of a computer 1102. The components of computer 1102 may include, but are not limited to, one or more processors or processing units 1104, a system memory 1106, and a system bus 1108 that couples various system components, including the processor 1104, to the system memory 1106.

The system bus 1108 represents one or more of any of several types of bus structures, including a memory bus or memory controller, a peripheral bus, an accelerated graphics port, and a processor or local bus using any of a variety of bus architectures. By way of example, such architectures can include a CardBus, Personal Computer Memory Card International Association (PCMCIA), Accelerated Graphics Port (AGP), Small Computer System Interface (SCSI), Universal Serial Bus (USB), IEEE 1394, a Video Electronics Standards Association (VESA) local bus, and a Peripheral Component Interconnects (PCI) bus also known as a Mezzanine bus.

Computer 1102 typically includes a variety of processor-readable media. Such media may be any available media that is accessible by computer 1102 and includes both volatile and non-volatile media, removable and non-removable media.

The system memory 1106 includes processor-readable media in the form of volatile memory, such as random access memory (RAM) 1110, and/or non-volatile memory, such as read only memory (ROM) 1112. A basic input/output system (BIOS) 1114, containing the basic routines that help to transfer information between elements within computer 1102, such as during start-up, is stored in ROM 1112. RAM 1110 typically contains data and/or program modules that are immediately accessible to and/or presently operated by the processing unit 1104.

Computer 1102 may also include other removable/non-removable, volatile/non-volatile computer storage media. By way of example, FIG. 11 illustrates a hard disk drive 1116 for reading from and writing to a non-removable, non-volatile magnetic media (not shown), a magnetic disk drive 1118 for reading from and writing to a removable, non-volatile magnetic disk 1120 (e.g., a "floppy disk"), and an optical disk drive 1122 for reading from and/or writing to a removable, non-volatile optical disk 1124 such as a CD-ROM, DVD-ROM, or other optical media. The hard disk drive 1116, magnetic disk drive 1118, and optical disk drive 1122 are each connected to the system bus 1108 by one or more data media interfaces 1126. Alternatively, the hard disk drive 1116, magnetic disk drive 1118, and optical disk drive 1122 may be connected to the system bus 1108 by one or more interfaces (not shown).

The disk drives and their associated processor-readable media provide non-volatile storage of processor-readable instructions, data structures, program modules, and other data for computer 1102. Although the example illustrates a hard disk 1116, a removable magnetic disk 1120, and a removable optical disk 1124, it is to be appreciated that other types of processor-readable media, which may store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 1116, magnetic disk 1120, optical disk 1124, ROM 1112, and/or RAM 1110, including by way of example, an operating system 1126, one or more application programs 1128, other program modules 1130, and program data 1132.

A user may enter commands and information into computer 1102 via input devices such as a keyboard 1134 and a pointing device 1136 (e.g., a "mouse"). Other input devices 1138 (not shown specifically) may include a microphone, joystick, game pad, satellite dish, serial port, scanner, and/or the like. These and other input devices are connected to the processing unit 1104 via input/output interfaces 1140 that are coupled to the system bus 1108, but may be connected by other interface and bus structures, such as a parallel port, game port, or a universal serial bus (USB).

A monitor 1142 or other type of display device, such as a video adapter 1044, may also be connected to the system bus 1108 via an interface. In addition to the monitor 1142, other output peripheral devices may include components, such as speakers (not shown) and a printer 1146, which may be connected to computer 1102 via the input/output interfaces 1140.

Computer 1102 may operate in a networked environment using logical connections to one or more remote computers, such as a remote computing device 1148. By way of example, the remote computing device 1148 may be a personal computer, portable computer, a server, a router, a network computer, a peer device or other common network node, and the like. The remote computing device 1148 is illustrated as a portable computer that may include many or all of the elements and features described herein, relative to computer 1102.

Logical connections between computer 1102 and the remote computer 1148 are depicted as a local area network (LAN) 1150 and a general wide area network (WAN) 1152. Such networking environments are commonplace in offices, enterprise-wide computer networks, intranets, and the Internet.

When implemented in a LAN networking environment, the computer 1102 is connected to a local network 1150 via a network interface or adapter 1154. When implemented in a WAN networking environment, the computer 1102 typically includes a modem 1156 or other means for establishing communications over the wide network 1152. The modem 1156, which may be internal or external to computer 1102, may be connected to the system bus 1108 via the input/output interfaces 1140 or other appropriate mechanisms. It is to be appreciated that the illustrated network connections are exemplary and that other means of establishing communication link(s) between the computers 1102 and 1148 may be employed.

In a networked environment, such as that illustrated with computing environment 1100, program modules depicted relative to the computer 1102, or portions thereof, may be stored in a remote memory storage device. By way of example, remote application programs 1158 reside on a memory device of remote computer 1148. For purposes of illustration, application programs and other executable program components, such as the operating system, are illustrated herein as discrete blocks, although it is recognized that such programs and components reside at various times in different storage components of the computing device 1102, and are executed by the data processor(s) of the computer.

Processor-executable Instructions

An implementation of an exemplary stream splicer may be described in the general context of processor-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Processor-readable Media

An implementation of an exemplary stream splicer may be stored on or transmitted across some form of processor-readable media. Processor-readable media may be any available media that may be accessed by a computer. By way of example, and not limitation, processor-readable media may comprise "computer storage media."

"Computer storage media" include volatile and non-volatile, removable and non-removable media implemented in any method or technology for storage of information such as processor-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embodies processor-readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared, and other wireless media.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computing device comprising:
   a media-stream transmission device; and
   a processor-readable storage medium having processor-executable instructions that, when executed by a processor, perform a method comprising:
   transmitting, to a receiver, a unicast acquisition media-stream transmission in response to a channel change, which corresponds to a target multicast media-stream transmission, the unicast acquisition media-stream transmission further comprising content including a first series of frames configured to be decoded by a receiver;
   transmitting, to the receiver, the target multicast media-stream transmission including a second series of frames, wherein the first series of frames includes the same content that is concurrently transmitting in the second series of frames; and
   receiving an indication to cease transmission of the unicast acquisition media-stream transmission.

2. A computing device as recited in claim 1, wherein the method further comprises:
   receiving an indication to change to a new channel, the new channel being the target multicast media-stream transmission, and a request for the target multicast media-stream transmission, wherein the target multicast media-stream transmission is representative of the new channel.

3. A computing device as recited in claim 1, wherein the method further comprises:
   receiving an indication to change to a new channel, the new channel being represented by the target multicast media-stream transmission and the unicast acquisition media-stream transmission, and a request for the unicast acquisition media-stream transmission which corresponds to the target multicast media-stream transmission.

4. A computing device as recited in claim 1, wherein the content of the target multicast media-stream transmission is configured to be decoded and presented at the receiver after receiving the indication to cease transmission.

5. A computing device as recited in claim 1, wherein frame properties of the unicast acquisition media-stream transmission match those of the target multicast media-stream transmission.

6. A computing device as recited in claim 1, wherein frame properties of the unicast acquisition media-stream transmission do not match those of the target multicast media-stream transmission.

7. A computing device as recited in claim 1, wherein frames of the unicast acquisition media-stream transmission are encoded using a lower bit-rate than that used by the target multicast media-stream transmission.

8. A computing device as recited in claim 1, wherein receiving the indication to cease transmission of the unicast acquisition media-stream transmission comprises receiving a request from the receiver to cease transmission.

9. A computing device as recited in claim 1, wherein the unicast acquisition media-stream transmission begins with a random-access point (RAP) that is prior to or co-located with a current transmission point of the target multicast media-stream transmission.

10. A computing device comprising:
a media-stream transmission device;
a processor-readable storage medium having processor-executable instructions that, when executed by a processor, perform a method comprising:
transmitting, to a receiver, a low bit-rate unicast acquisition media-stream transmission in response to a channel change, which corresponds both in time and in content to a target normal bit-rate multicast media-stream transmission, the content of the unicast acquisition media-stream transmission configured to be decoded and displayed by the receiver;
transmitting, to the receiver, a normal bit-rate unicast intermediate media-stream transmission, which corresponds to the target multicast media-stream transmission and includes a first series of frames,
receiving a request from the receiver for cessation of transmission of the unicast acquisition media-stream transmission wherein content of the unicast intermediate media-stream transmission is configured to be decoded and displayed by the receiver;
transmitting the multicast media-stream transmission including a second series of frames, wherein the first series of frames includes the same content that is concurrently transmitting in the second series of frames; and
receiving a request from the receiver for cessation of transmission of the unicast intermediate media-stream transmission,
wherein content of the target multicast media-stream transmission is configured to be decoded and displayed at the receiver.

11. A computing device as recited in claim 10, wherein the method further comprises:
receiving an indication to change to a new channel, the new channel being the target multicast media stream transmission, and wherein the transmission of the target multicast media-stream transmission is representative of the new channel.

12. A computing device as recited in claim 10, wherein frame properties of the unicast intermediate media-stream transmission match those of the target multicast media-stream transmission.

13. A computing device as recited in claim 10, wherein frame properties of the unicast acquisition media-stream transmission do not match those of the target multicast media-stream transmission.

14. A computing device as recited in claim 10, wherein frames of the unicast acquisition media-stream transmission are encoded using a lower bit-rate than that used by the unicast intermediate media-stream transmission.

15. A computing device as recited in claim 10, wherein frames of the unicast acquisition media-stream transmission are encoded using a lower bit-rate than that used by the target multicast media-stream transmission.

16. A processor-readable storage medium excluding signals per se, the processor-readable storage medium having processor-executable instructions stored thereon that, when executed by a processor, perform a method comprising:
transmitting a target multicast media-stream transmission which includes at least a first series of frames;
transmitting, in response to a channel change, a unicast acquisition media-stream transmission, where content of the unicast acquisition media-stream transmission corresponds in subject matter to that of the target multicast media-stream transmission and includes a second series of frames, and wherein the second series of frames includes the same content that is concurrently transmitting in the first series of frames, where the content of the unicast acquisition media-stream transmission is configured to be decoded and presented at a receiver; and
receiving a request for cessation of transmission of the unicast acquisition media-stream transmission.

17. A storage medium as recited in claim 16, wherein the content of the target multicast media-stream transmission is configured to be decoded and presented at the receiver after receiving the request for cessation of transmission of the unicast acquisition media-stream transmission.

18. A storage medium as recited in claim 16, wherein frame properties of the unicast acquisition media-stream transmission match those of the target multicast media-stream transmission.

19. A storage medium as recited in claim 16, wherein frame properties of the unicast acquisition media-stream transmission do not match those of the target multicast media-stream transmission.

20. A storage medium as recited in claim 16, wherein frames of the unicast acquisition media-stream transmission are encoded using a lower bit-rate than that used by the target multicast media-stream transmission.

21. A storage medium as recited in claim 16, wherein the unicast acquisition media-stream transmission begins at a random access point (RAP) prior to a current transmission point of the target multicast media-stream transmission.

22. A storage medium as recited in claim 16, wherein the unicast acquisition media-stream transmission begins at a random access point (RAP) co-located with a current transmission point of the target multicast media-stream transmission.

23. A computing device comprising:
a media-stream transmission device; and
a storage medium as recited in claim 16.

24. A method facilitating fast channel-change, the method comprising:
transmitting a target multicast media-stream transmission having a first series of frames;
transmitting, in response to a channel change, a unicast acquisition media-stream transmission having a second series of frames, wherein content of the unicast acquisition media-stream transmission corresponds to the target multicast media-stream transmission, and wherein the second series of frames includes the same content that is concurrently transmitting in the first series of frames, and wherein the content of the unicast acquisition media-stream transmission is configured to be decoded and presented at a receiver, and receiving a request for cessation of transmission of the unicast acquisition media-stream transmission.

25. A method as recited in claim 24, wherein content of the target multicast media-stream transmission is configured to be decoded and presented at the receiver after receiving the request for cessation of transmission of the unicast acquisition media-stream transmission.

26. A method as recited in claim 24, wherein frame properties of the unicast acquisition media-stream transmission match those of the target multicast media-stream transmission.

27. A method as recited in claim 24, wherein frame properties of the unicast acquisition media-stream transmission do not match those of the target multicast media-stream transmission.

28. A method as recited in claim 24, wherein frames of the unicast acquisition media-stream transmission are encoded using a lower bit-rate than that used by the target multicast media-stream transmission.

29. A method as recited in claim 24, wherein the unicast acquisition media-stream transmission begins with a random-access point (RAP) that is prior to a current transmission point of the target multicast media-stream transmission.

30. A method as recited in claim 24, wherein the unicast media-stream transmission begins with a random-access point (RAP) co-located with a current transmission point of the target multicast media-stream transmission.

31. A computer comprising one or more processor-readable storage media having processor-executable instructions that, when executed by the computer, perform the method as recited in claim 24.

32. A multimedia system comprising:
one or more transmitters configured to transmit to a receiver a target multicast media-stream transmission having first frames and a unicast acquisition media-stream transmission having second frames in response to a channel change, wherein the unicast acquisition media-stream transmission corresponds to the target multicast media-stream transmission by including a series of frames in the first frames that is the same content that is concurrently transmitting in the second frames;

wherein the receiver includes a decoding unit configured to decode both the unicast acquisition media-stream transmission and the target multicast media-stream transmission, and a splicing unit configured to splice from the reception of the unicast acquisition media-stream to the reception of the target multicast media-stream transmission at one of the second frames.

33. A system as recited in claim 32, wherein a first transmitter transmits the target multicast media-stream transmission and a second transmitter transmits the unicast acquisition media-stream transmission.

34. A system as recited in claim 32, wherein frame properties of the unicast acquisition media-stream transmission match those of the target multicast media-stream transmission.

35. A system as recited in claim 32, wherein frame properties of the unicast acquisition media-stream transmission do not match those of the target multicast media-stream transmission.

36. A system as recited in claim 32, wherein the second frames of the unicast acquisition media-stream transmission are encoded using a lower bit-rate than that used by the target multicast media-stream transmission.

37. A system as recited in claim 32, wherein the splicing unit is further configured to perform its splice before the reception of a random-access point (RAP) in the target multicast media-stream transmission.

38. A system as recited in claim 32, wherein the splicing unit is further configured to perform its splice during or close to the reception of a random-access point (RAP) in the target multicast media-stream transmission.

39. A method of channel changing in a receiver, the method comprising:
processing a request to change to a new channel corresponding to a target multicast media stream, the target multicast media stream including first media content;

receiving, prior to commencing receiving the target multicast media-stream, a unicast media-stream including the first media content that is concurrently being transmitted in the target multicast media stream, in response to processing;

receiving, after a last frame of the unicast media-stream is received, a portion of the target multicast media-stream including second media content corresponding to the new channel;

displaying the first media content of the unicast media-stream; and after displaying the last frame of the unicast media-stream, switching to displaying the second media content of the target multicast media-stream.

40. The method of claim 39, wherein the processing comprises requesting the unicast acquisition media-stream prior to requesting the target multicast media-stream.

41. The method of claim 39, wherein the processing comprises requesting the unicast acquisition media-stream concurrently with requesting the target multicast media-stream.

42. A method of channel changing, comprising:
transmitting a target multicast media-stream corresponding to a new channel;

processing a request from a receiver to change to the new channel;

in response to the processing and prior to commencing transmitting the target multicast media stream to the receiver, transmitting to the receiver a unicast media-stream including first media content corresponding to the new channel, wherein the first media content is transmitted to the receiver in the unicast stream concurrently with the first media content being transmitted in the target multicast media-stream but not yet being transmitted to the receiver;

transmitting to the receiver, after a last frame of the unicast media-stream is transmitted, a portion of the target multicast media-stream including second media content; and receiving a request from the receiver to cease transmission of the first media content of the unicast media-stream,
wherein the first media content of the unicast media-stream and the second media content of the multicast media-stream are configured to be displayed by the receiver.

* * * * *